(12) United States Patent
Arnold

(10) Patent No.: US 6,663,195 B1
(45) Date of Patent: Dec. 16, 2003

(54) ELECTRICALLY OPERATED PARKING BRAKE CONTROL SYSTEMS

(75) Inventor: James H. Arnold, Moberly, MO (US)

(73) Assignee: Orscheln Management Co., Moberly, MO (US)

(*) Notice: Subject to any disclaimer, the term of this patent is extended or adjusted under 35 U.S.C. 154(b) by 0 days.

(21) Appl. No.: 10/080,618

(22) Filed: Feb. 25, 2002

Related U.S. Application Data

(63) Continuation of application No. 09/512,309, filed on Feb. 24, 2000, now Pat. No. 6,406,102.
(60) Provisional application No. 60/121,488, filed on Feb. 24, 1999.

(51) Int. Cl.$^7$ ................................................. B60T 8/88
(52) U.S. Cl. ................................................. 303/122.03
(58) Field of Search ........................... 303/122, 122.03, 303/122.08, 122.1, 122.14

(56) References Cited

U.S. PATENT DOCUMENTS

| | | |
|---|---|---|
| 3,089,064 A | 5/1963 | De Bennetot |
| 3,428,867 A | 2/1969 | Becker |
| 3,590,605 A | 7/1971 | Low |
| 3,693,110 A | 9/1972 | Briggs, Jr. et al. |
| 3,740,615 A | 6/1973 | Vigini |
| 3,789,876 A | 2/1974 | Kempton et al. |
| 3,854,695 A | 12/1974 | Baugh |
| 4,004,258 A | 1/1977 | Arnold |
| 4,041,546 A | 8/1977 | Stewart |
| 4,059,844 A | 11/1977 | Stewart |
| 4,082,369 A | 4/1978 | Black et al. |
| 4,112,365 A | 9/1978 | Larson et al. |
| 4,262,320 A | 4/1981 | Herron |
| 4,295,111 A | 10/1981 | Wang |
| 4,295,177 A | 10/1981 | Woodhouse et al. |
| 4,321,946 A | 3/1982 | Paulos et al. |
| 4,341,241 A | 7/1982 | Baker |
| 4,453,652 A | 6/1984 | Merkal et al. |
| 4,490,771 A | 12/1984 | Huber et al. |
| 4,553,890 A | 11/1985 | Gulistan |
| 4,620,173 A | 10/1986 | O'Brien |
| 4,631,627 A | 12/1986 | Morgan |
| 4,645,271 A | 2/1987 | Brearey et al. |
| 4,680,667 A | 7/1987 | Petrie |
| 4,690,168 A | 9/1987 | Kihm |
| 4,700,304 A | 10/1987 | Byrne et al. |
| 4,729,056 A | 3/1988 | Edwards et al. |
| 4,733,212 A | 3/1988 | Goodwin |
| 4,749,891 A | 6/1988 | Sheng |
| 4,757,418 A | 7/1988 | Bruckner |
| 4,797,779 A | 1/1989 | Richards et al. |
| 4,809,742 A | 3/1989 | Grau |
| 4,810,952 A | 3/1989 | Cohen |
| 4,810,964 A | 3/1989 | Granberg et al. |
| 4,845,420 A | 7/1989 | Oshizawa et al. |
| 4,878,147 A | 10/1989 | Oyama et al. |

(List continued on next page.)

Primary Examiner—Jack Lavinder
Assistant Examiner—Benjamin A Pezzlo
(74) Attorney, Agent, or Firm—Michael D. Bednarek; Shaw Pittman LLP

(57) ABSTRACT

A system and method for controlling an electrically operated parking brake-by-wire system is disclosed. More particularly to a method and system for control of electrically operated parking brake-by-wire systems that interfaces with various elements and systems of a motor vehicle; processes information obtained from vehicle systems, parking brake by wire systems, and the driver/user; and uses this information to safely control the operation of the parking brake-by-wire system, alerting the driver/user to potential problems associated with operation of the parking brake-by-wire system and related vehicle systems. The present invention also includes provisions to provide feedback to users and handle situations where the parking brake is actuated while the vehicle is in motion.

12 Claims, 15 Drawing Sheets

U.S. PATENT DOCUMENTS

| | | |
|---|---|---|
| 4,907,901 A | 3/1990 | Mitchell |
| 4,950,985 A | 8/1990 | Voss et al. |
| 4,950,987 A | 8/1990 | Vranish et al. |
| 4,953,590 A | 9/1990 | Kakinuma et al. |
| 4,970,622 A | 11/1990 | Büchl |
| 4,980,793 A | 12/1990 | Glowczewski et al. |
| 5,004,077 A | 4/1991 | Carlsen et al. |
| 5,032,812 A | 7/1991 | Banick et al. |
| 5,036,961 A | 8/1991 | Eberling et al. |
| 5,045,786 A | 9/1991 | Fischer, Werner |
| 5,115,193 A | 5/1992 | Bean et al. |
| 5,121,018 A | 6/1992 | Oldakowski |
| 5,139,315 A | 8/1992 | Walenty et al. |
| 5,180,038 A | 1/1993 | Arnold et al. |
| 5,180,978 A | 1/1993 | Postma et al. |
| 5,185,542 A | 2/1993 | Lazorchak |
| 5,196,983 A | 3/1993 | Stumpf |
| 5,218,308 A | 6/1993 | Bösebeck et al. |
| 5,241,218 A | 8/1993 | Page |
| 5,250,883 A | 10/1993 | Okada |
| 5,250,884 A | 10/1993 | Okumura |
| 5,258,669 A | 11/1993 | Nakashima |
| 5,270,449 A | 12/1993 | Bohlen et al. |
| 5,270,900 A | 12/1993 | Alden et al. |
| 5,289,131 A | 2/1994 | Heidt et al. |
| 5,347,419 A | 9/1994 | Caron et al. |
| 5,404,303 A | 4/1995 | Pattantyus et al. |
| 5,422,593 A | 6/1995 | Fujihira |
| 5,422,780 A | 6/1995 | Lignar |
| 5,424,637 A | 6/1995 | Oudyn et al. |
| 5,428,496 A | 6/1995 | Buchta |
| 5,433,132 A | 7/1995 | Hufault |
| 5,438,489 A | 8/1995 | Judy et al. |
| 5,443,132 A | 8/1995 | Arnold |
| 5,450,276 A | 9/1995 | Olifant et al. |
| 5,457,364 A | 10/1995 | Bilotti et al. |
| 5,463,263 A | 10/1995 | Flynn |
| 5,470,043 A | 11/1995 | Marts et al. |
| 5,481,237 A | 1/1996 | Sarfati et al. |
| 5,497,093 A | 3/1996 | Sundeen et al. |
| 5,529,281 A | 6/1996 | Brudnicki et al. |
| 5,541,806 A | 7/1996 | Hoffman |
| 5,583,434 A | 12/1996 | Moyers et al. |
| 5,594,384 A | 1/1997 | Carroll et al. |
| 5,630,489 A | 5/1997 | Bebernes |
| 5,632,468 A | 5/1997 | Schoenmeyr |
| 5,657,002 A | 8/1997 | Ogden |
| 5,667,282 A | 9/1997 | Kim |
| 5,701,109 A | 12/1997 | Poulsen |
| 5,704,693 A | 1/1998 | Mackiewicz |
| 5,809,441 A | 9/1998 | McKee |
| 5,957,551 A | 9/1999 | Maron et al. |
| 5,962,931 A * | 10/1999 | Maron et al. ............... 307/125 |
| 6,015,194 A | 1/2000 | Decker |
| 6,019,436 A | 2/2000 | Siepker |
| 6,158,822 A | 12/2000 | Shirai et al. |
| 6,213,259 B1 * | 4/2001 | Hanson et al. ............. 188/156 |
| 6,293,363 B1 * | 9/2001 | Rangaswamy et al. ..... 180/287 |
| 6,450,587 B1 * | 9/2002 | MacGregor et al. ......... 303/89 |
| 6,533,082 B2 * | 3/2003 | Gill et al. ................... 188/156 |

\* cited by examiner

ELECTRICALLY OPERATED PARKING BRAKE CONTROL SYSTEMS

RELATED APPLICATIONS

This application is a continuation of Ser. No. 09/512,309 filed Feb. 24, 2000, now U.S. Pat. No. 6,406,102, which claims priority to U.S. provisional patent application No. 60/121,488, entitled Device, Method, and System For Control of Electrically Operated Parking Brake by Wire Systems, filed on Feb. 24, 1999.

BACKGROUND

1. Field of the Invention

This present invention relates to a system and method for control of electrically operated parking brake-by-wire systems, and more particularly to a method and system for controlling the operation of electrically operated parking brake-by-wire systems that interfaces with various elements and systems of a motor vehicle which is capable of processing information obtained from vehicle Systems, parking brake by wire systems, and the driver/user; and using this information to prevent inadvertent and/or inappropriate operation of the parking brake-by-wire system, alerting the driver/user to potential problems associated with operation of the parking brake-by-wire system and related vehicle systems.

2. Background of the Invention

With the advent of parking brake by wire systems, parking brake systems that are engaged/disengaged by an electrical contact closure, inadvertent operation or operating the system at an inappropriate time could result in loss of control of the vehicle due to a lock-up condition of the parking brake axle, which is normally the rear axle. Parking brake activator systems such as systems described in U.S. Pat. No. 5,004,077 of Carlson et al., titled Electromechanical Parking Brake System, and U.S. Pat. No. 5,180,038 of Arnold et al., titled Electronically Controlled Parking Brake System, provide the force/power to operate a conventional mechanically operated parking brake system. These systems do not use conventional foot or hand operated controls but have electromechanical devices (motors) for operating the control mechanism (hand lever or foot pedal) for the driver/user.

Generally, prior art exists with regard to the following areas: 1) Control and Interface systems between parking brake(s) and Stop Lights; 2) Control Systems for electrically operated Parking Brakes; 3) Electronic/Electric Parking Brake(s); and 4) Illumination Systems/Designs for Shift Position Indicators.

Information on vehicle systems is available in the following reference books: 1)Modern Automotive Technology by James E. Duffy, 1994; 2) Chilton General Motors Chevy/GMC Pickups and Suburban 1980–87 Repair Manual; 3) Chilton General Motors Full-Size Trucks 1988–96 Repair Manual, and 4) Automotive Electronics Handbook by Ronald Jurgen, 1994.

True parking brake-by-wire systems such as described in U.S. Pat. No. 5,443,132 of Arnold, titled Magnetic Latch Mechanism and Method Particularly for Brakes, describe a self-contained system built into the wheel assembly that is attached to the axle. This system contains an activation mechanism and a parking brake system which share common components with the service brake system designed/built into the wheel assembly on an axle. This system only requires an electrical controller/driver (power supply and switch) for operation.

Currently, there are no viable systems that adequately control the operation of the new generation of parking brake-by wire-systems to allow the static parking brake system to operate safely in a dynamic environment. Designs of parking brake systems have tended to focus on the static designs and operation of the parking brake system, as opposed to emergency brake systems designed for dynamic operation.

The early generation of parking brake-by-wire systems were digital in nature either being fully On (i.e., applied), or fully Off (i.e., released). Parking brake-by-wire systems, electrically operated parking brake systems, such as the Magnetic Latching Parking Brake (MLPB), and other systems, such as that described by U.S. Pat. No. 5,443,132, titled Magnetic Latch Mechanism and Method Particularly for Brakes, and U.S. Pat. No. 5,180,038 of Arnold et al., titled Electronically Controlled Parking Brake System, provide the force/power to operate a conventional parking brake system. These systems do not use conventional foot or hand operated controls but have electromechanical devices (motors) for operating a control mechanism for the driver/user only requiring a switch contact closure and associated power source to operate, engage/disengage the parking brake.

Early parking brake-by-wire systems were either "Fully On" or "Fully Off" and often lacked user/driver intervention/control and provided the user/operator with little or no feedback pertaining to the use, operation, or status of the system. These systems, with their digital operating nature, present some very interesting problems relating to operation of the system when the vehicle is moving or in a dynamic operating mode. For example, most systems currently do not allow modulation, partial application, or other control of the rate of application, which is necessary to stop a moving vehicle without causing 'lock-up' of the braking wheels of the parking brake system (typically the rear axle).

In contrast, the second or the new generation of parking brake-by-wire systems is capable of being modulated or partially applied to provide a controlled amount of braking. However, even with this new generation of parking brake by-wire-systems, inadvertent operation of the parking brake system can lead to unexpected braking, resulting in loss of control of the vehicle or rear-end collisions due to the lack of an interface between the parking brake-by-wire system and the stop/brake lights. Emergency situation brake requirements (service brake failure) must prevent total lock out of these parking brakes by wire systems, which would otherwise prevent their engagement during dynamic operation and thus eliminate 'emergency brake' function.

In the prior art, as long as this type of system is used as a 'static' parking brake and is not intended to function as a 'dynamic' emergency brake, these designs and control systems and operating switches are sufficient so long as the braking system is locked-out or prevented from engaging when the vehicle is moving. However, in the rare occurrence of service brake failure, these systems need to be available as an emergency brake or dynamic brake. The lack of control of the amount of brake application force of these digital type systems has not gained acceptance by major automotive or the driver/user and generally have not been produced for vehicles.

There remains a need for a control system for a parking brake-by-wire system that interfaces with the various elements and systems of a motor vehicle; processes various information obtained from vehicle systems, parking brake-by-wire systems, and the driver/user; and uses this information to safely control the operation of the parking brake-by-wire system, alerting the driver/user to potential problems associated with operation of the parking brake-by-wire system and related vehicle systems.

Conventional brake systems contain: 1) a force/energy management converter (an initiator or parking brake pedal/lever); 2) a linkage or force transfer unit (conventional brake cables); 3) an activator (brake arm); and 4) brake, friction. The driver/user activates the parking brake pedal or lever which generates cable tension on the brake cables. These cables are connected to a brake arm at the drum or disc which applies the friction brake. This cable tension causes the brake arm to exert pressure on stationary friction material which then contacts the drum/disc holding the vehicle in place (if the vehicle is stopped). If the vehicle is moving, this static brake can be used to stop or slow the vehicle.

Brake-by-Wire Systems, whether service or parking brake, have similar components/functional elements. These functional elements are: 1) an initiator (switch operator); 2) driver (electronics control unit/module); 3) force generating system (energy pack-motor/gear-box, hydraulics, etc.); 4) force transfer system (cable, linkage, etc.); and 5) mechanical brake (friction). The initiator or switch operator provides the contact information to an electrical driver that controls/conditions electrical power that is used by the force generating system which converts electrical energy into mechanical force. The force transfer unit transfers the force generated/produced by the force generating system (motor, etc.) to the mechanical friction brake. The force transfer system may be a simple link bar or as complex as a mechanical cable with its sliding inter member and flexible conduit.

Conventional mechanical parking brake systems provide user feedback that establishes functionality and user confidence in operation of the parking brake system. Feedback factors of sight, sound, and physical sensation gives the user of these systems immediate and easily understood indications of the status and operation of these traditional systems. These feedback factors and backup/supporting systems are absent in the current brake-by-wire systems, and contribute to potential liability exposure for the manufacturers and to lack of user confidence in these new systems.

Conventional mechanical parking brake systems normally provide up to eight (8) feedback functions/factors that reassure functionality and establish user confidence in operation of the parking brake system. These feedback factors include; 1) visual position of the parking brake pedal or lever; 2) physical position of the parking brake pedal or lever before application; 3) sound, or lack of sound of the parking brake system being engaged; 4) force provided by the driver as the pedal or lever apply the parking brake; 5) characteristics of the application resistance; 6) smooth transition from the released position to the applied position; 7) release characteristics (including sound) of the release cycle; and 8) the physical position of the pedal or lever after the system is engaged The visual physical position of the brake pedal or lever is usually associated with the parking brake system but is also applicable to the service brake system. This sensation/stimulus is basically; 'Is the pedal, or lever, in the position it should be?' This sensation is processed by the senses to determine if the brake is applied or released in the case of a parking brake and if the system is working for the service brake.

The senses determine the physical position of the pedal or lever when applying the system. If the pedal or control is not in the position it should be, the senses detect a function problem alerting the driver/user to a potential functional problem of the system. The sound or absence of sound of the system operation provides an indication of the system functionally. If the system makes an unusual sound, it is normally associated with some type of problem with the use and operation of the system. The visual feedback, sound, and physical feedback mechanisms give the user of the system immediate and easily understood indications of the status and operation of the braking system.

SUMMARY OF THE INVENTION

It is an object of the present invention to provide a control system for an electrically operated parking brake-by-wire system that interfaces with various elements and systems of a motor vehicle that processes various information obtained from vehicle systems, parking brake by wire systems, and the driver/user using this information to safely control the operation of an electrically operated parking brake-by-wire system, alerting the driver/user to potential problems associated with operation of said parking brake-by-wire system and related vehicle systems.

A further object of the present invention is to control the operation of a parking brake-by-wire system using an electronic control system that provides advantages that include the following; 1) eliminates the possibility of inadvertent operation; 2) allows operation of the parking brake-by-wire system in a dynamic mode functioning as an emergency brake; 3) allow unimpaired operation in the static mode; 4) and warns the driver/user of impending parking brake operation and to possibly expect lock-up of the brake axle containing the parking brake system.

A further object of the present invention is to classify dynamic operation distinguishing between; 1) dynamic operation as an emergency brake in the event of service brake failure; 2) dynamic operation in an automatic mode with the microcontroller/program controlling the application rate; and 3) dynamic operation with the driver/user controlling the application of more/less braking force in a 'servo' type system. Each dynamic operating mode is accompanied with its own set of operating audio/verbal indicators.

Other objects of the control system of the present invention include preventing operation of parking brake by wire systems in a dynamic mode with a functioning service brake except for driver/user initiated over-ride operation. In addition, the present invention provides an interlock system with pre-operating conditions forming an electrically operated parking brake system that results in safer operation of the vehicle and provides for a safer operating environment for personnel around vehicles equipped with such a system.

An embodiment of the present invention includes a method and system for controlling the application and release of parking brake-by-wire systems, distinguishing between operations in the following: 1) dynamic operation with service brake failure; 2) dynamic mode with a full functioning service brake; and 3) static mode. The present invention provides for elimination of the inadvertent application of parking brake-by-wire system when the vehicle is in motion with full functioning service brake system reducing the possibility of loss of control of the vehicle due to unexpected "locking-up" of the parking brake axle. The present invention notifies/signals the driver/user of impending change of state of the parking brake-by-wire system and provides audio status and operational information about the system.

In addition, an embodiment of the present invention incorporates the use of a dash mounted 'Parking Brake Unsafe Indicator' that provides the driver/user with information regarding the status of the parking brake system, indication that the system is transitioning, or of potential problems with either the supporting vehicle systems or with the parking brake system and/or electronics. Also included in an embodiment of the present invention are electrical operation of the dash mounted 'Brake' light; a new and unique optional electrical driver having a microcontroller interface to a mechanical (relay) driver; and incorporation of a dash mounted combination light indicating the initiation of an operational cycle that is reset by the completion of initiated operational cycle.

The present invention provides a method and system that eliminates, or drastically reduces, the operator/operational errors/problems associated with the use of electrically operated parking brake by wire system such as inadvertent application. This invention includes use of; 1) bi-color LEDs as switch illuminators and fault monitors; 2) allows the use of a parking brake system intended for static/stationary operation to be used in a dynamic mode as an emergency brake; and 3) establishes/sets operating preconditions for; a) apply cycle in both dynamic and static modes; and b) release cycle in both dynamic and static modes.

An embodiment of the present invention comprises an electronic control system that directly operates parking brake-by-wire systems using a built-in driver or indirectly operates a parking brake-by-wire system by controlling the operation of an external driver. The method and system of this embodiment processes a driver/user request for activation/deactivation, switch contact closure, of the parking brake-by-wire system, processes/evaluates brake operational related vehicle data, and produces the proper response. In this embodiment, direct operation of the parking brake-by-wire system includes use of an electrical driver (optional) that is capable of operating the main electrical drive (e.g., motor, solenoid, electromagnetic assembly) of the parking brake-by-wire system. Indirect operation of the parking brake-by-wire system includes use of the control system to generate the appropriate control signals to correctly operate an external electrical drive unit of the parking brake-by-wire system.

An embodiment of the present invention includes both hardware (switch), electrical circuits/components, software routines/program concepts, and program algorithm(s) for the control and operation of an electrically operated parking brake-by-wire system. This system resides between the operating switch (contact closure) for the parking brake by wire system and the parking brake by wire hardware.

The preferred embodiment provides a novel arrangement and use of circuit elements to perform the complex task of operating a remote electrically operated device in a safety related application, such as a parking brake system. The preferred embodiment includes the use of a microcontroller based electronic design that contains a monitoring system for the operation of the electronics. In addition, reliability is further assured, in the preferred embodiment, by the use of operational indicators such as a parking brake unsafe indicator mounted in the dash, operational fault indicator mounted in the dash, and other components to provide the user with assurance of proper operation and other information about the system's functions, including indications of transitions of the electrically operated parking brake-by-wire system.

The preferred embodiment, which can be referred to as a "Device, Method, and System For Control of Electrically Operated Parking Brake by Wire Systems" or alternatively as a "Control Means/System," relates to the operation of parking brake-by-wire systems in safety related applications, such as automotive parking brake systems such as described in U.S. Pat. No. 5,443,132 to Arnold; entitled: 'Magnetic Latch Mechanism And Method Particularly For Brakes;" issued Aug. 22, 1995, which is incorporated by reference, herein. The invention may also be used in conjunction with the electronically powered parking brake disclosed in U.S. patent application Ser. No. 09/217,807, entitled "Device, Method and System for control of an Electronically Powered Parking Brake," filed Dec. 22, 1998, which is incorporated by reference, herein.

An embodiment of the invention also includes a dash mounted indicator assembly containing the 'Parking Brake UnSafe' and 'Fault' indicators illuminated by bi-color LEDs. The bi-polar light emitting diode (LED) driver provides individual current limiting resistors for each color of the bi-colored LEDs, allowing the driving circuit to be optimized for each color, and the Electronics Control Unit (ECU) includes use of the layered interrupt handler and microcontroller tri-state output to provide efficient and effective use of I/O ports available.

An embodiment of the present invention further includes a Fault Monitor for the use of a differential signal pair to set and reset a latching relay and control the illumination of an indicator. This feature also includes use of a circuit to produce a fault indication upon activation of a functional operational cycle initiate circuit that is independent of the microcontroller operated electronics. The circuit features include the ability to be set with hardware and reset with software providing the user/operator with an indication on the functionality of the microcontroller and its associated operating program.

An embodiment of the present invention thus uses a cost effective combination of solid-state and mechanical components, relays, to form a hybrid electrical drive unit that is capable of generating bi-polar electrical pulse or pulse width modulated drive signals in a cost effective manner. An embodiment of the hybrid electrical drive is its ability to provides; 1) steady state electrical drive signals of bi-polar (+/− or −/+) origin; 2) short duration pulse of bi-polar (+/− or −/+) origin; or 3) pulse width modulated signals to operate electrically operated parking brake-by-wire system to their full potential. Further, the Hybrid Electrical Drive of an embodiment of the present invention is a fault tolerate design, requiring a minimum of two failures to disable the driver. In order to enable the external brake/clutch, the primary control circuit must have two enable signals to function properly. A direction control signal is required to enable one relay, and a master control signal is required to enable the master switch. A malfunction in the directional control circuitry does not cause activation of the external brake/clutch, but does affect operation of the unit. A malfunction in the master control does not cause activation or cause non-operation of the unit, but does ultimately affect the optimal life expectancy of the electronics. This arrangement of directional control and master control provides added operational safety and eliminates inadvertent operation due to impact on the electronics.

It is understood that there are numerous significant aspects of the invention described herein. One aspect of the present invention is the way interrupts are handled by the microcontroller within the Electronics Control Unit (ECU). Using an interrupt handler, change state detector, in association with the normal interrupts allows an infinite number of interrupts to be handled and processed. By breaking the interrupts into two levels, direct acting which will bring the microcontroller out of its 'sleep' mode when the vehicle is in its 'standby' mode (parked with no key in the ignition) and Class II interrupts which are generated when the vehicle is in an operating mode (key in the ignition). The number and usage of interrupts is a major design element in the use of microcontrollers.

Another aspect of the present invention is the handling of Input/Output (I/O) signals. Breaking the I/O lines into two levels; Direct/Active I/O's and Multiplexed I/O's allows expanded use of interrupts. Input/Output signals are placed in one of two categories depending on whether they require direct access to the microcontroller when the vehicle is in a 'standby' mode (ignition key removed for over x-minutes) or only requiring access to the microcontroller when the system is powered-up (an ignition key in ignition switch). Direct acting I/O relate to input/output to peripheral systems of the vehicle while multiplex signals relate to internal operation of the Control Means/System electronics.

Another aspect of the present invention is the Parking Brake UnSafe Indicator. Some form of indicator, dash mounted light or signal, will be used to indicate that the vehicle is equipped with an electrical parking brake system. This indicator would provide the driver with additional information concerning the operation and status of parking brake-by-wire systems.

Another aspect of the present invention is the use of a signal generated by the presence of a key in the ignition switch. The presence of an ignition key provides critical information on the status of the driver (in vehicle, for example) and provides switchable (controlled) power that is more 'in-tune' to the status of the vehicle, standby or active mode, than the status of the ignition switch (On/Off). Whether a key is in the ignition switch, or not, is a more accurate indication of the operating status of the vehicle than using the status of the ignition switch. The signal also provides a more subtle reminder to remove the ignition key when exiting, opening the driver side door.

Another aspect of the present invention is the remote input interface, which allows an outside signal for vehicle systems, security system, to activate the parking brake-by-wire system.

Additional features and advantages of the invention well be set forth in the description which follows, and in part will be apparent from the description, or may be learned by practicing the invention. The objectives and other advantages of the invention will be realized and attained by the structure particularly pointed out in the written description and claims as well as the appended drawings.

DETAILED DESCRIPTION

The present invention, referred to as the "Control Means/System" will now be described in detail in connection with the attached drawings.

The Control Means/System is a computer/microcontroller operated interface system that monitors specific inputs related to parking brake function and operation to produce a specified output to an electrically operated parking brake-by-wire system. Its function is to 1) allow unimpeded operation of an electrically operated parking brake-by-wire system while the vehicle is stationary; 2) prevent inadvertent or inappropriate application of the parking brake-by-wire system when the vehicle is in motion; 3) allow operation of an electrically operated parking brake-by-wire system in a dynamic mode during times of emergency (service brake failure); 4) allow operation of an electrically operated parking brake system in a driver controlled modulatable dynamic braking mode under controlled conditions; 5) user/driver initiated dynamic over-ride operation in an automatic mode with the microcontroller/program controlling the application rate and 6) provide the users/operators of electrically operated parking brake-by-wire systems with operational information pertaining to the use, operation, and status of said systems.

Figure 1:
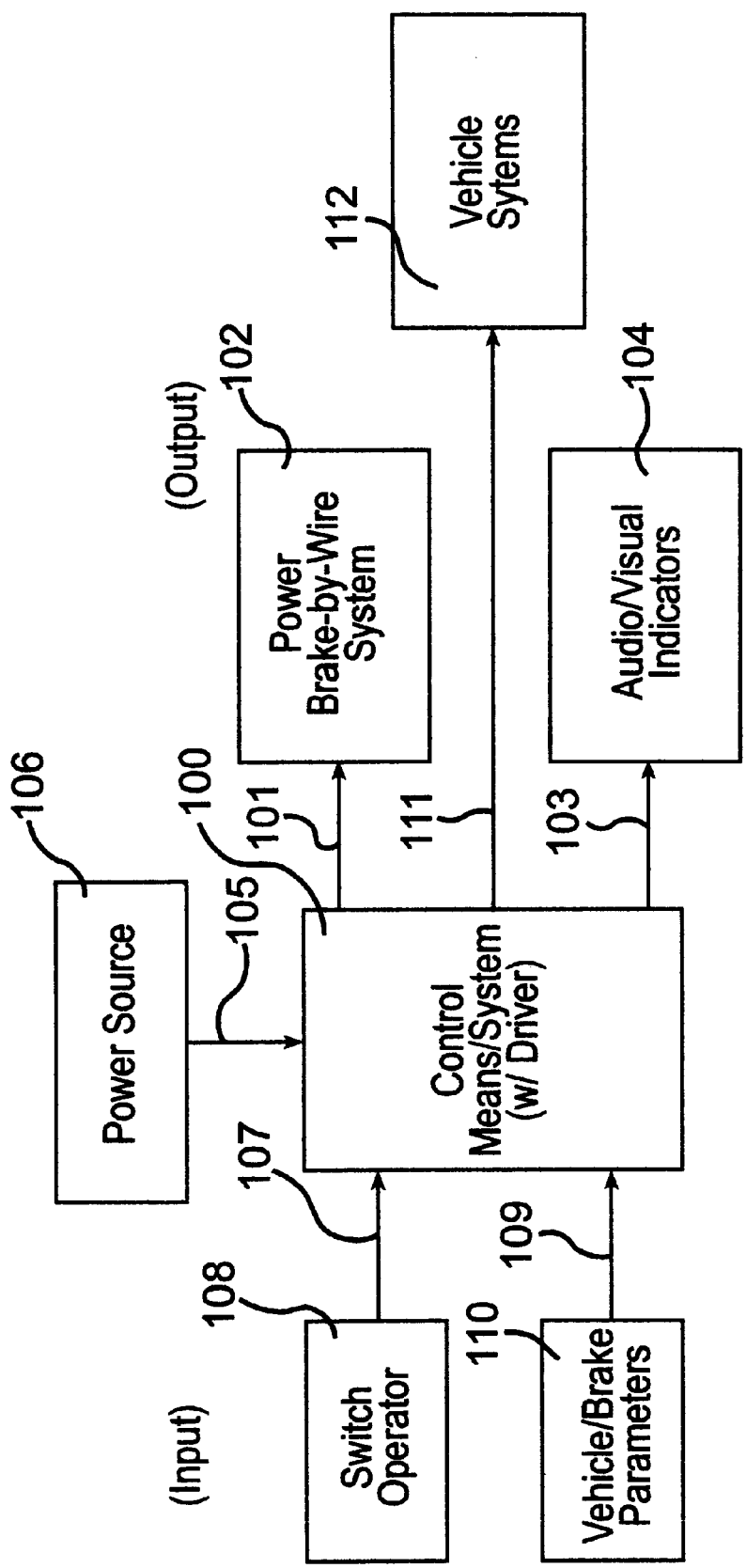
FIG. 1 shows an overall functional block diagram of the Control Means/System using an internal electrical driver as it functions as an interface between an operating switch and a parking brake-by-wire system.
Figure 2:
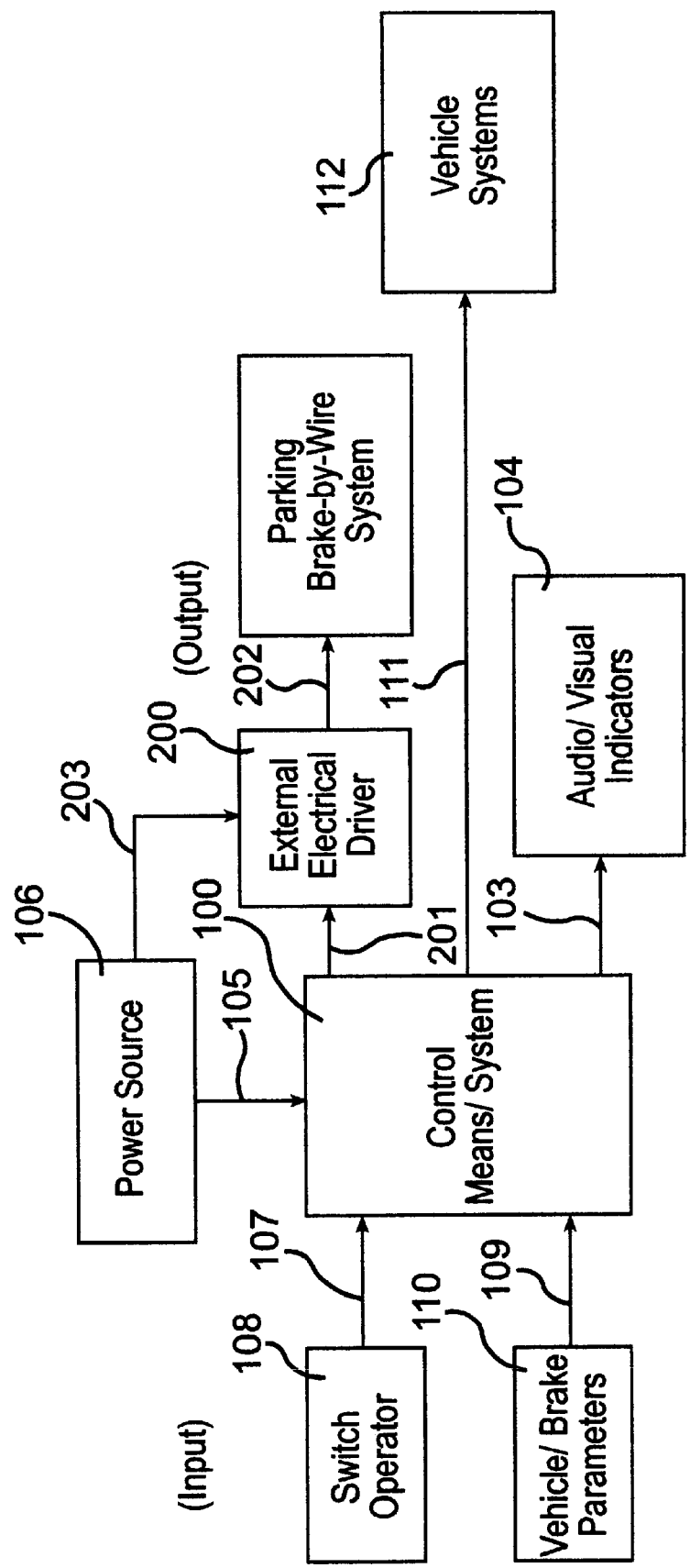
FIG. 2 depicts a block diagram of the Control Means/System operating an external electrical driver functioning as an interface between an operating switch and a parking brake-by-wire system processing information provided by vehicle systems

In a preferred embodiment of the invention shown in FIG. 1, the Control Means/System contains an optional built-in electrical driver for operating the electrically operated parking brake-by-wire system in both the dynamic and static braking modes. In another embodiment of the invention as shown in FIG. 2, an external electrical driver is used in conjunction with the Control Means/System to control the application initiation by providing the appropriate operating signals to the external electrical driver which in-turn operates the parking brake-by-wire system.

In order for the Control Means/System to perform it assigned task, it monitors the status of: 1) various vehicle systems and; 2) watches for a change in switch contact status within an operating switch. Being supplied operating power it provides; 1) conditioned signal(s)/power to the parking brake-by-wire system or external electrical driver for operating the device and 2) it provides operational and status information to the user/operator of said system in the form of visual and audio signal(s)/indicator(s). Functioning as an interface monitoring: 1) oil pressure; 2)operational status of the service brake's; 3) service brake application; 4) transmission range select/gear position; 5) driver door open; 6) key in ignition switch; 7) vehicle speed; and 8) remote brake operation; the Control Means/System processes the monitored information to provide the driver/user of electrically operated parking brake-by-wire system with; 1) operational information regarding the status, operation, and functionality of the said system; 2)safe operation of an electrically operated parking brake-by-wire system; and 3) controlled operation of an electrically operated parking brake-by-wire system in a modulatable dynamic mode. The Control Means/System uses hardware, firmware, and software to accomplish its designed task and objectives. Hardware in the form of both electrical and mechanical systems, condition, amplify, and adapt signals produced/generated by the vehicle and it its associated systems for use by the computer/microcontroller while making signals produced/generated by the computer/microcontroller usable by the electronics and hardware of the vehicle. Firmware in the form of small logic arrays and networks perform their assigned task without the aid of volatile memory storage (information that is lost when power is removed from the device). Software contained in the operating program within the computer/microcontroller define/describe a series of events that allow the system to complete its assigned task and function.

In a preferred embodiment of the invention, operation of the electrically operated parking brake-by-wire system is unimpeded when the vehicle is stationary except for the normal interlock conditions imposed by the vehicle manufacturer. However, the Control Means/System provides operational and status information to the user/operator in the form of audio and visual indications when the vehicle is stationary. Tonal information regarding operation and status of the electrically operated parking brake-by-wire system is provided by two or more tones together or in combination of low intensity intended to be in the background. Tonal information regarding possible unsafe operation or dynamic operation of an electrically operated parking brake-by-wire system are provided at high intensity intended to be in the foreground.

In a preferred embodiment of the invention, the Control Means/System monitors at least one of the following: 1) oil pressure; 2) operational status of the service brake; 3) service brake application (service brake applied); and 4) transmission/shifter position to establish the operating conditions for applying the parking brake-by-wire system when the vehicle is in motion. In the preferred embodiment of the invention, automatic emergency operation of the parking brake-by-wire system will only be permitted if: 1) the engine is developing oil pressure; 2) there has been or is a service brake failure; 3) service brakes are applied (service brake pedal depressed); and 4) the transmission range/gear select lever is in a drive position other than the highest drive gear/range. In the preferred embodiment of this invention, when these operating conditions are met, the Control Means/System produces audio and visual indications that the parking brake system will be engaged and to expect sudden deceleration.

With the primary control system of the Control Means/System being a computer or microcontroller operated system, operational control of the system is determined/defined by the operating programs running within the computer/microcontroller. These programs, software, specify how and where program entry is obtained and under what condition while defining what operations are to be performed by other branches of the program. These programs are a series of branches/loops that contains instructions on tasks that the system is to perform and contain instruction on what to do once an assigned task has been completed. The computer/microcontroller within the Control Means/System functions primarily as a process control computer that responds to particular input conditions and a specified programming structure or syntax. With the computer/microcontroller responding to a change in signal (s), interrupt(s), the programs and hardware must be structured to respond to specific changes in signals. With a limited number of primary direct acting interrupts available, other methods of monitoring signals for a change in status must be employed. In a preferred embodiment of this invention, signals which required monitoring with the system in the stand-by mode (ignition Off with key removed) were monitored by the primary direct acting interrupt of the computer/microcontroller. Signals which required monitoring when the system was powered (ignition key in switch) were monitored by a powered change state detector which produced/generated a primary direct acting interrupt at the computer/microcontroller port. Interrupt summation provided by the powered change state detector causes the operating program to 'clock' in a data word pertaining to the status of the modified signal where the operating program determines which signal produced the change in state/status.

In a preferred embodiment of the invention, entry into the primary control program is allowed when at least one of the following is met: 1) there is a change in the status of the switch contact(s) of the operating switch; 2) change in the status of the transmission range/gear select lever; 3) a change is the status of the remote operational input; 4) reception of a pulse from a wheel speed sensor; 5) driver side door is opened or interrupt present from the change state detector (process depends upon status of ignition key sensor); or 6) the ignition key/door interlock interface line goes active.

In a preferred embodiment of the invention, entry into the primary control program by a change in status of any of the signals supplied to the powered change state detector is allowed when there is an ignition key in the ignition switch or a segment of an operating programs has enabled the change state detector power system. Of the signals provided to the powered change state detector, only signals related to switch operator and status of the drive side door have direct access to the main operating program. The remaining signals generate interrupts used by sub-routines and other program segments other than the main operating program. The remaining signals provide information pertaining to operation of the optional internal electrical driver, operational interface information, and/or fault information. Some examples of operational interface information are: 1) oil pressure; 2) service brake monitor; and 3) service brake status is used in controlling the application of the electrically operated parking brake-by-wire system.

In a preferred embodiment of the invention, a change in the status of the parking brake apply switch causes the main operating program to jump/branch to a program segment specified/defined by that interrupt. This interrupt, apply switch activation, would cause a specified program segment to process, 'apply cycle', which would define/invoke a series of events/processes that would apply the electrically operated parking brake-by-wire system. In a preferred embodiment of the invention, this particular series of events/processes would apply, or attempt to apply the parking brake and invoke a program segment that would wait for verification of the apply operation or trigger a fault condition. If an apply indication was received/generated, a separate program segment would verify/confirm that the parking brake had been applied setting the system, both hardware and software, for the next perceived operating condition while providing appropriate audio and visual responses. If the cycle completion signal was not received/generated, the fault portion of the program would be completed providing a fault indication to the user/operator in the form of both audio and visual indicators. Once all of the required/assigned tasks have been completed, the 'apply cycle' program turns monitoring back to the primary operating program which waits for its next interrupt.

In a preferred embodiment of the invention, a change in the status of the transmission range/gears select lever causes the main operating program to jump/branch to a program segment specified/defined by that interrupt. This interrupt, transmission in bad gear, would cause a specified program segment to process/run a routine related to the transmission being pulled out of gear or the gear shift lever changing position. This interrupt, transmission in bad gear, would cause a specified program segment to process, 'gear change', which would define/invoke a series of events/processes that would apply the electrically operated parking brake-by-wire system preventing the vehicle from rolling away and sound the vehicle's horn alerting by-standers to a rolling/moving vehicle. This program segment would use parts/segments of the 'apply cycle' program to apply and vary application of the parking brake while other segments of the program would deal with sounding the vehicle's horn.

In a preferred embodiment of the invention, a change in the status of remote operational input signal would cause the main operating program to jump/branch to a program segment specified/defined by that interrupt. This interrupt, remote brake application, would cause a specified program segment to process/run a routine related to the parking brake application as part of a remotely operated security system. This interrupt, remote brake application, would cause a specified program segment to process, 'remote apply', which would define/invoke a series of events/processes that would apply the electrically operated parking brake-by-wire system as part of a theft deterrent system.

In a preferred embodiment of the invention reception of a wheel speed sensor pulse causes the main operating program to jump/branch to a program segment specified/defined by that interrupt. This interrupt, unauthorized movement, would cause a specified program segment to process/run a routine related to an unattended vehicle moving due to being improperly parked. This interrupt, unauthorized movement, would cause a specified program segment to process, 'bad movement', which would define/invoke a series of events/processes that would apply the electrically operated parking brake-by-wire system preventing the vehicle from rolling away and sound the vehicle's horn alerting by-standers to movement of an unattended vehicle. This program segment would use parts/segments of the 'apply cycle' program to apply and vary application of the parking brake while other segments of the program would deal with sounding the vehicle's horn.

User/driver initiated dynamic over-ride braking is accomplished with the use of a programming algorithm which gradually applies the parking brake system allowing the brake application force to be held and maintained at any level along the brake application curve. This algorithm fully applies the brake when the vehicle is placed in "park" or the ignition is turned Off; or the system is released by initiating a release cycle.

Emergency Dynamic braking mode applies the parking brake at a much faster rate but does not allow stopping at any partial apply ending in full application. Although the entry into the operating program is through the apply/release switch, the way the switch is manipulated provides multiple functions or more that one apply characteristic.

The set/reset characteristics of the initiate fault circuitry allows a circuit to set, turn On a Fault Indicator while a second circuit turns Off or resets the circuit. In a preferred embodiment of the invention, a third circuit is used to control the color of the Fault Indicator while still requiring a dedicated circuit to turn Off, reset, the system. In this preferred embodiment, any contact closure of either the apply or release switch results in illumination of the Fault Indicator which can be reset, turned Off, by a signal from the microcontroller or by cycling, changing position/status, of the Ignition Switch. This preferred embodiment provides information on the functionality of the microcontroller, whether it is working or not, while providing a means/method of turning Off the Fault Indicator in order to prevent excessive drain on the vehicle's electrical system resulting from the microcontroller not being able to reset the Fault Indicator.

In a preferred embodiment of the invention as shown in FIG. 1, the Control Means/System 100 with its internal electrical driver, functions as an interface; processing inputs from a Switch Operator 108 and Vehicle/Brake Parameters 110 while providing outputs to the Parking Brake-by-Wire System 102, Audio/Visual Indicators 104, and Vehicle Systems 112. A Power Source 106 provides electrical energy from the vehicle electrical system to the Control Means/System by conductor 105. Controlled and conditioned electrical power is provided by the Control Means/System to the Audio/Visual Indicators 104 by buss 103 for illumination of the dash mounted indicators and powering the speaker. The Control Means/System also controls the electrical energy provided to the electrically operated Parking Brake-by-Wire System 102 by buss 101. Switch Operator 108 provides electrical information pertaining to contact closures of the apply and release switch contacts to the Control Means/System by buss 107. The Control Means/System 100 provides electrical power to operate the switch illuminators within the apply/release switch operators by buss 107. Vehicle/Brake Parameters such as: 1) oil pressure; 2)operational status of the service brakes; 3) service brake application; 4) transmission range select/gear position; 5) driver door open; 6) key in ignition switch; 7) vehicle speed; 8) ignition switch status; and 9) remote brake operation; are provided by Vehicle/Brake Parameters 110 to the Control Means/System 100 by buss 109. The Control Means/System 100 provides signals by buss 111 to Vehicle System 112 for operating the vehicle's Stop/Brake Lights, disengaging Cruise Controls, the sounding the vehicle's Horn when there is an unauthorized vehicle movement or the transmission has been pulled out of gear.

FIG. 2 shown an embodiment of the invention using an External Electrical Driver 200 to condition and control the application of electrical power to the Parking Brake-by-Wire System 102. Electrical Conductor 203 provides electrical power to the External Electrical Driver 200 for operation of the Parking Brake-by-Wire System. Electrical buss 111 provides a bi-polar signal pair consisting of an electrical supply and an electrical return path. The Control Means/System provides appropriate and applicable control signals by buss 201 for correct operation of the External Electrical Driver.

Figure 3:
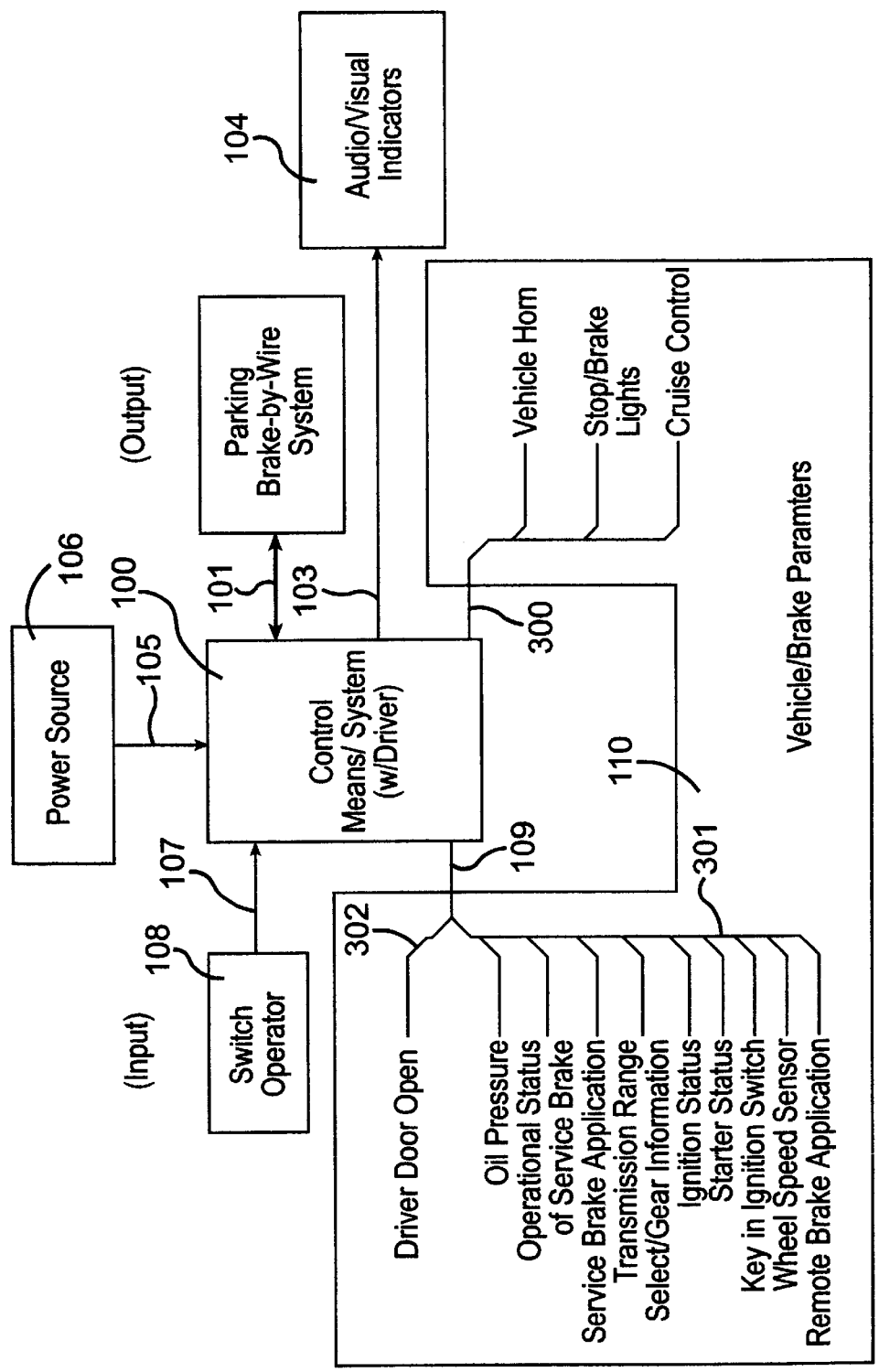
FIG. 3 shows a detailed block diagram of the full functional interface between a power source, vehicle systems, operating switch, and parking brake-by-wire system.

FIG. 3 provides additional information on the input interface provided by Vehicle/Brake Parameters 110 and Vehicle Systems 112 for the Control Means/System 100. Vehicle/Brake Parameters provide: 1) status of the driver side door whether it is open or closed; 2) oil pressure information; 3) operational status of the service brakes; 4) service brake application information; 5) transmission range/gear select information; 6) ignition status; 7) starter status; 8) key in ignition switch; 9) wheel speed information; and 10) remote brake application information to the Control Means/System by conductor 302 and buss 301 which form input buss 109. Output buss 300 provides output information from the Control Means/System 100 to Vehicle System. This output buss provides a means/method for the Control Mean/System to operate the vehicle's horn, Disengage the cruise control, and operate the vehicle's stop/brake lights.

Figure 4:
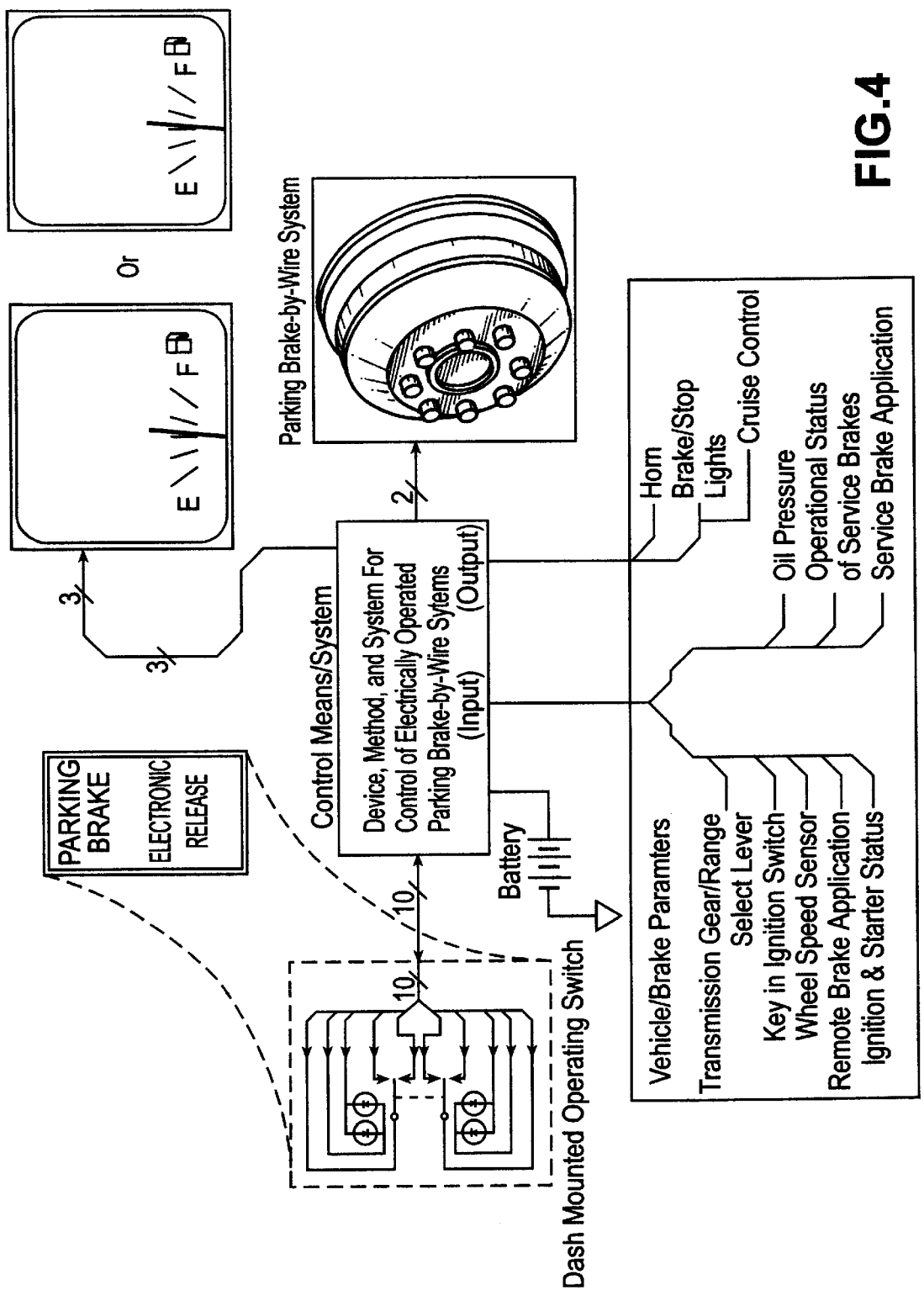
FIG. 4 shows a close-up, of a vehicle dashboard, shows various components, an operating switch, dash mounted visual indicators, and electrically operated drum type parking brake-by-wire system, of the system according to an embodiment of the present invention.
Figure 5:
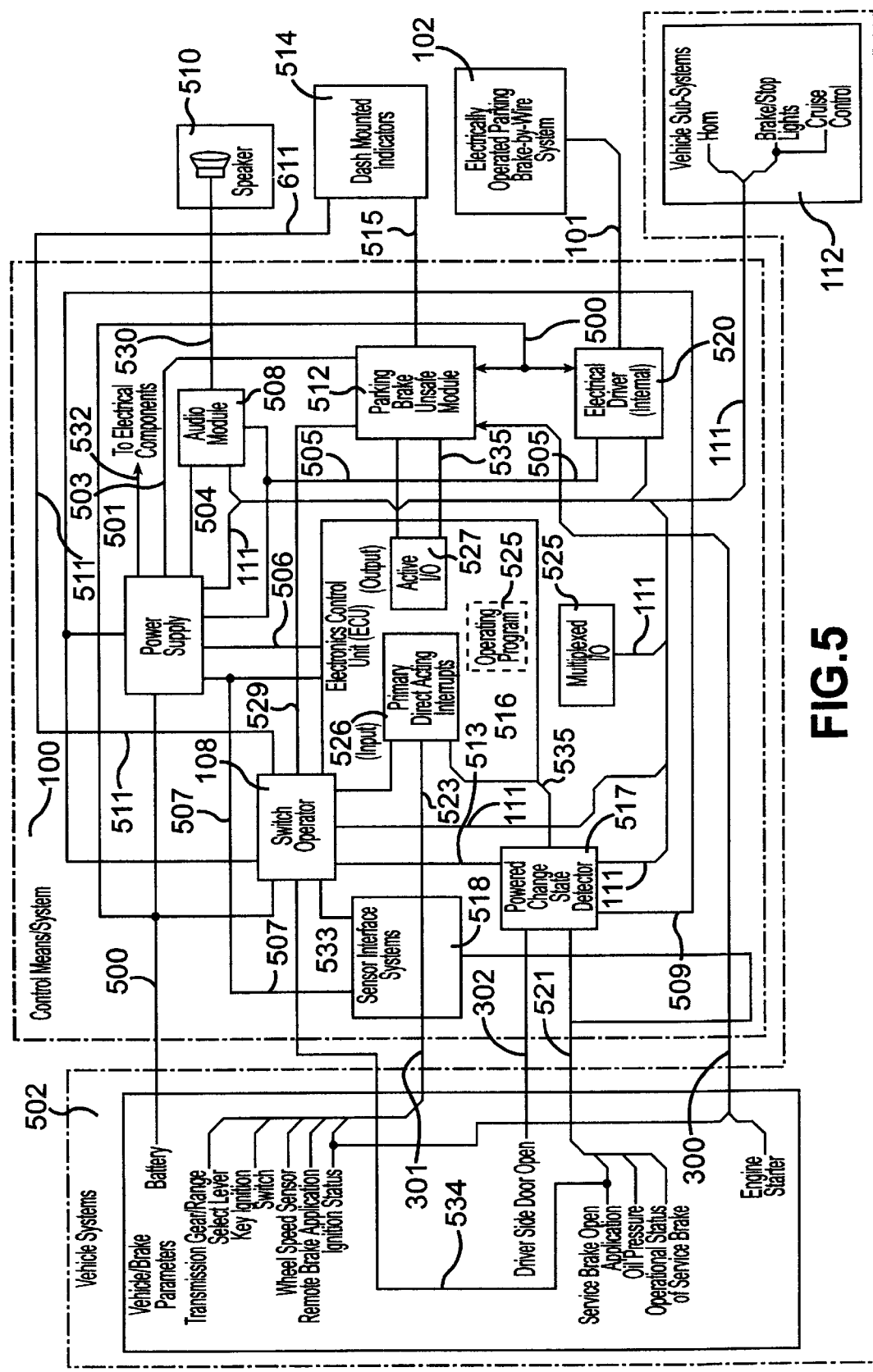
FIG. 5 is a basic block diagram showing basic functional elements of a Control Means/System using an internal electrical driver to provide operating power for an electrically operated parking brake-by-wire system.
Figure 6:
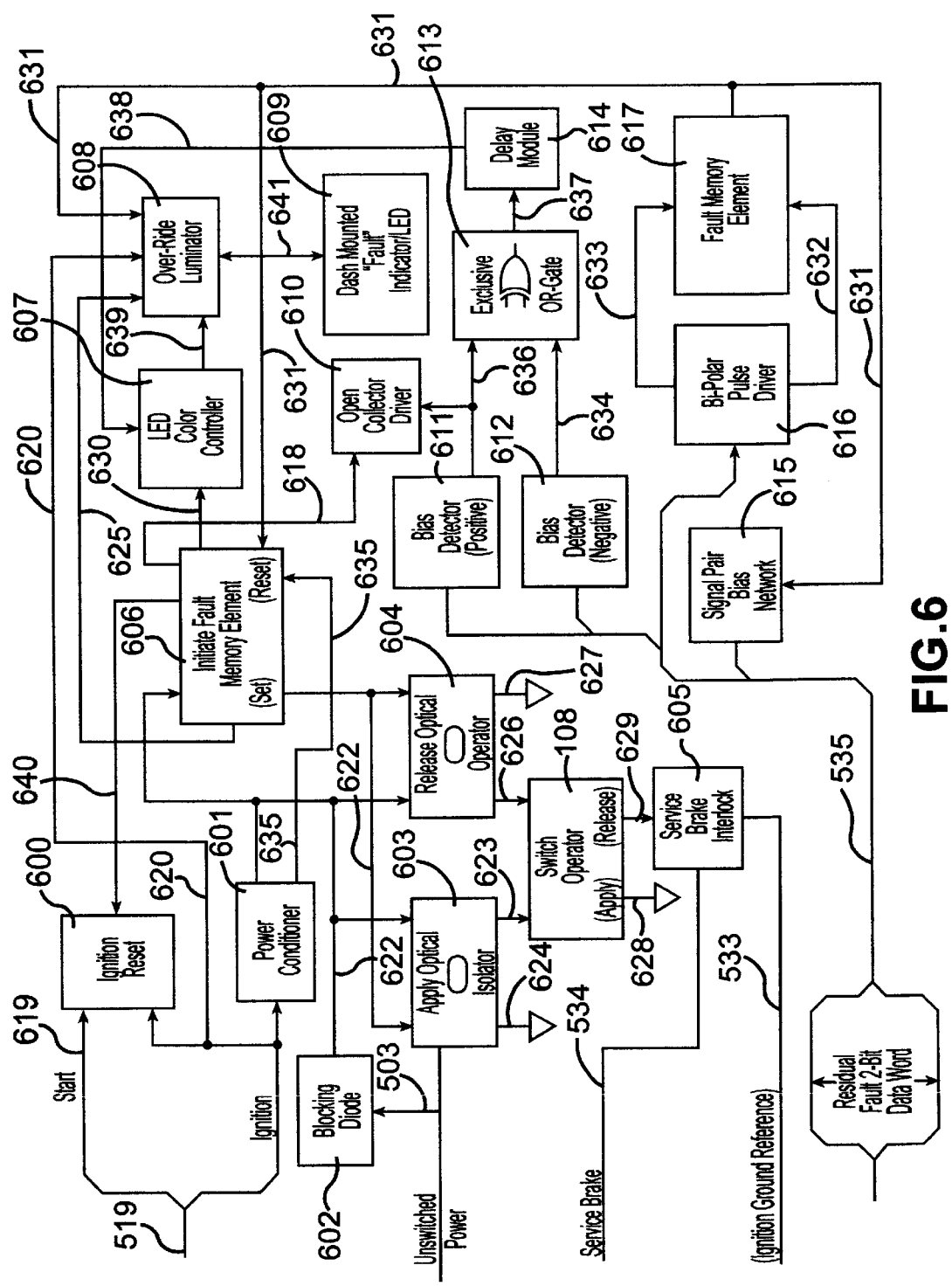
FIG. 6 shows the functional elements of the initiate fault system within the Control Means/System
Figure 7:
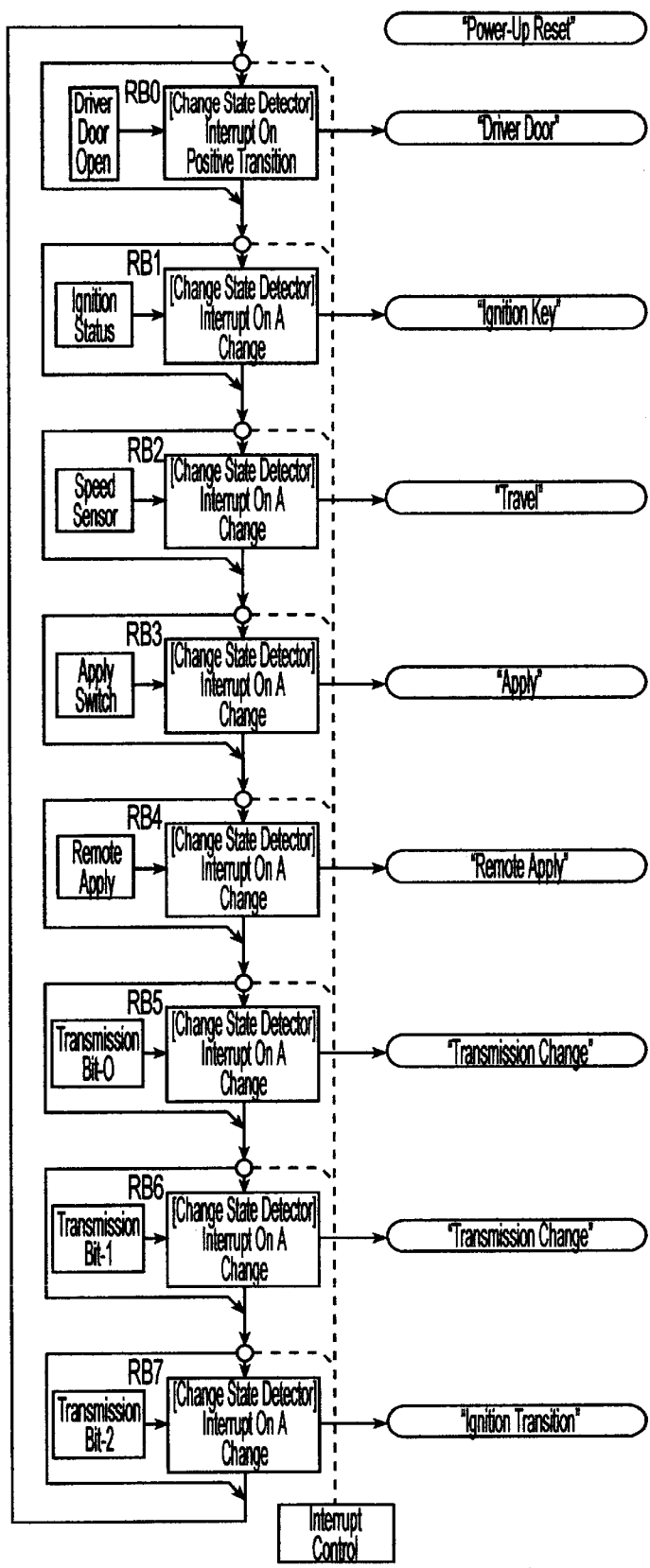
FIG. 7 shows a functional representation of the microcontroller interrupt structure when entry into the operation running within the microcontroller can be obtained.
Figure 8:
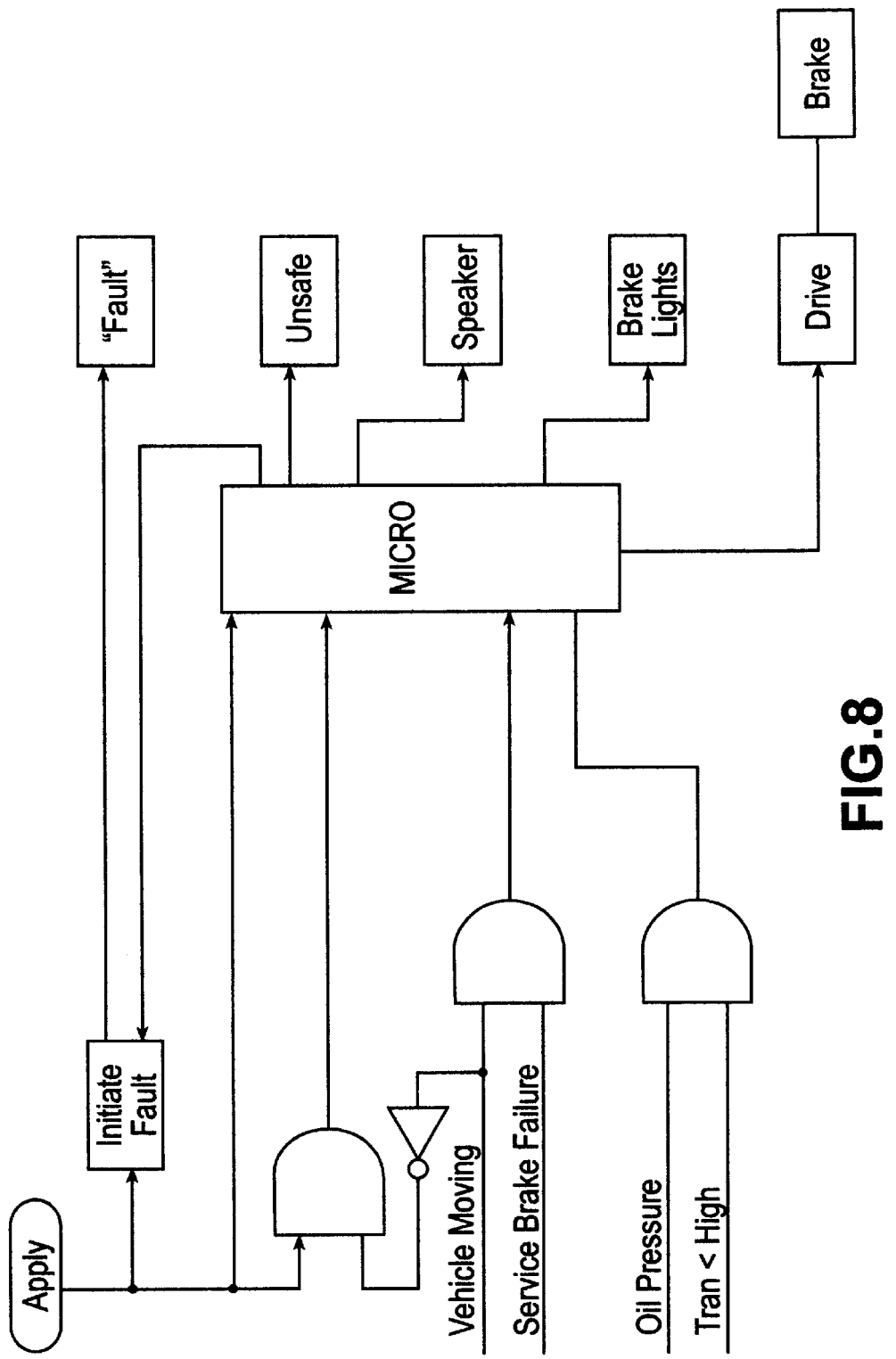
FIG. 8 shows a logical representation of the apply operation/function of the Control Means/System interface.
Figure 9:
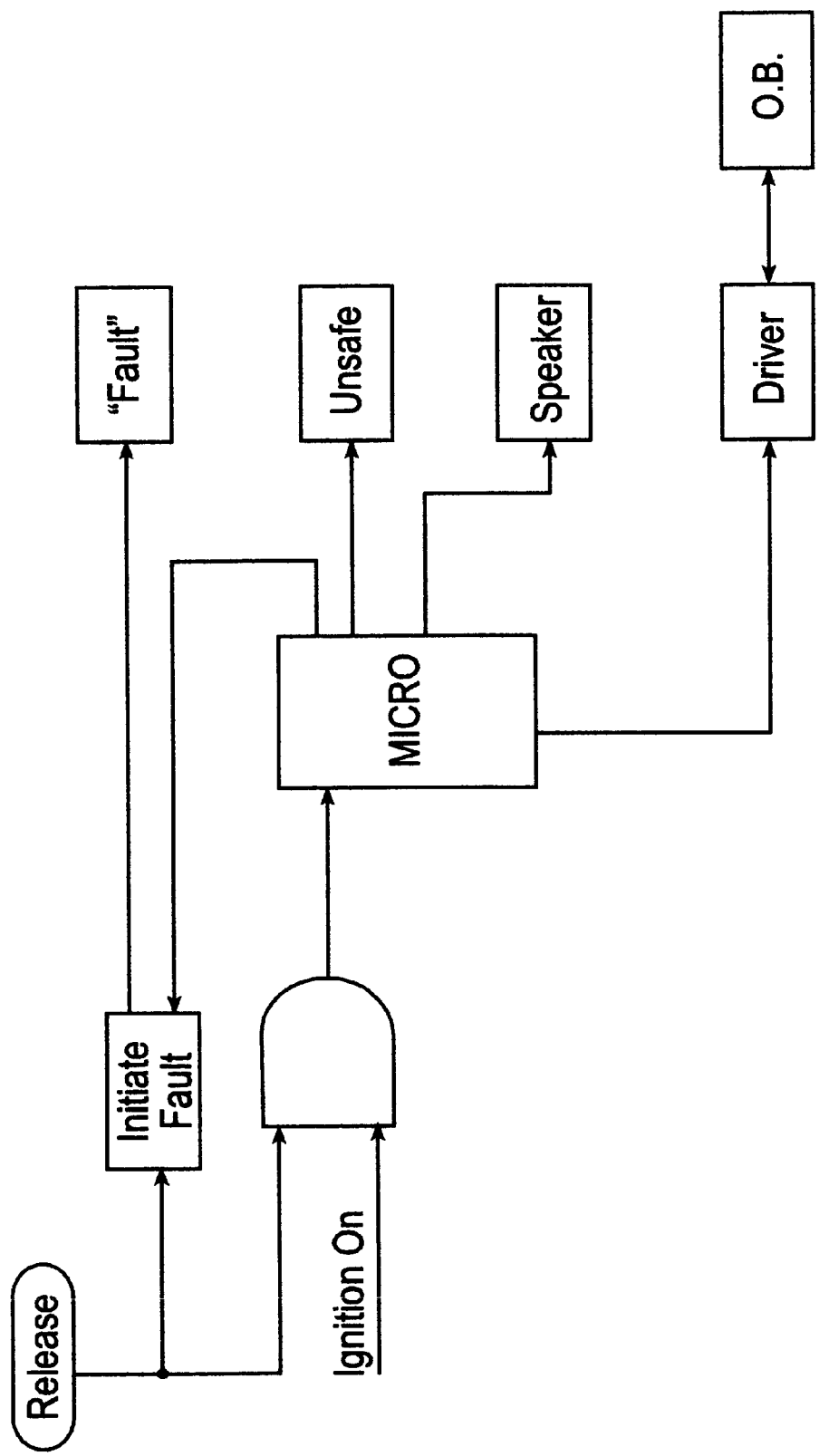
FIG. 9 shows a logical representation of the release operation/function of the Control Means/System interface.
Figure 10:
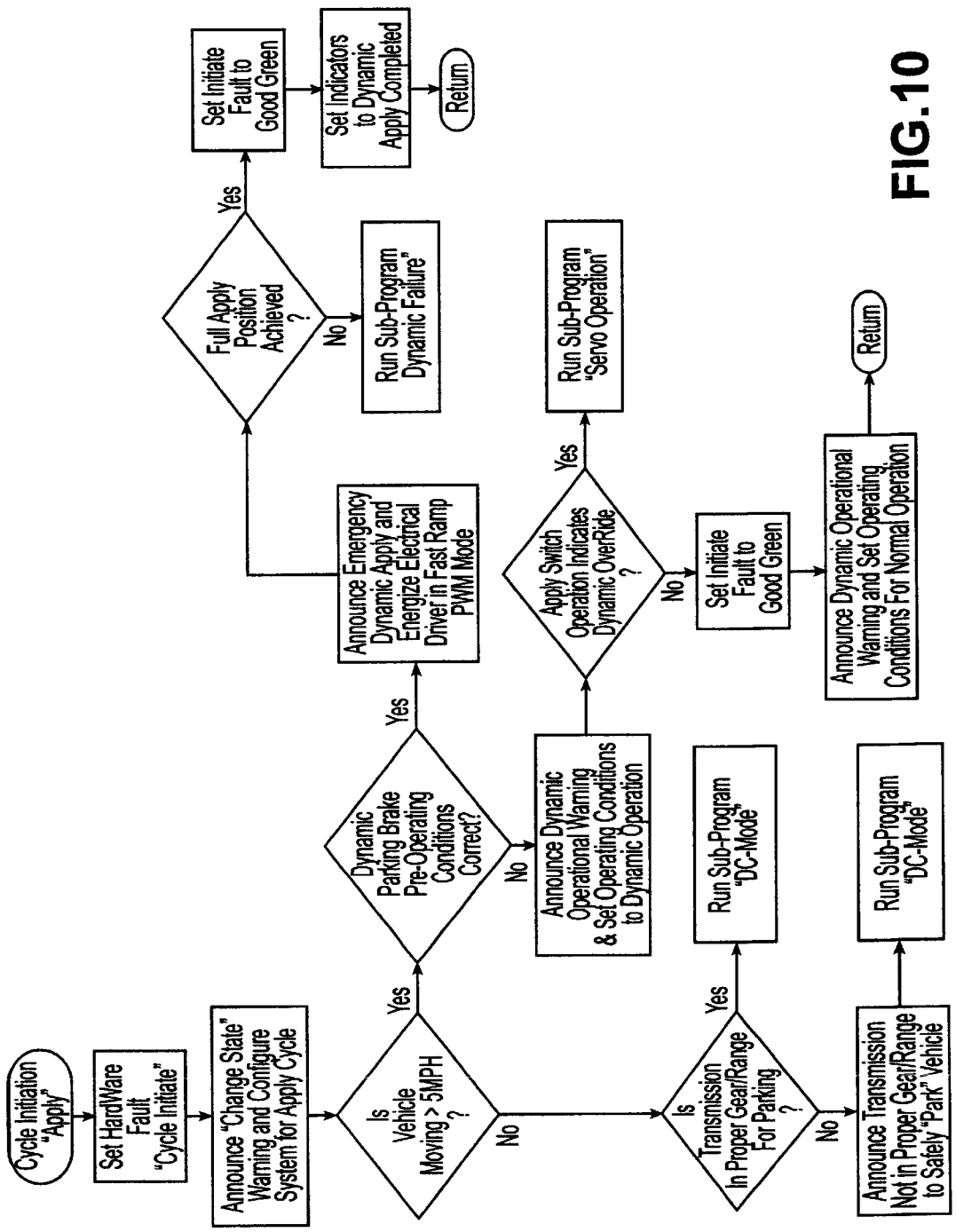
FIG. 10 is a flow chart of the Apply operating program
Figure 11:
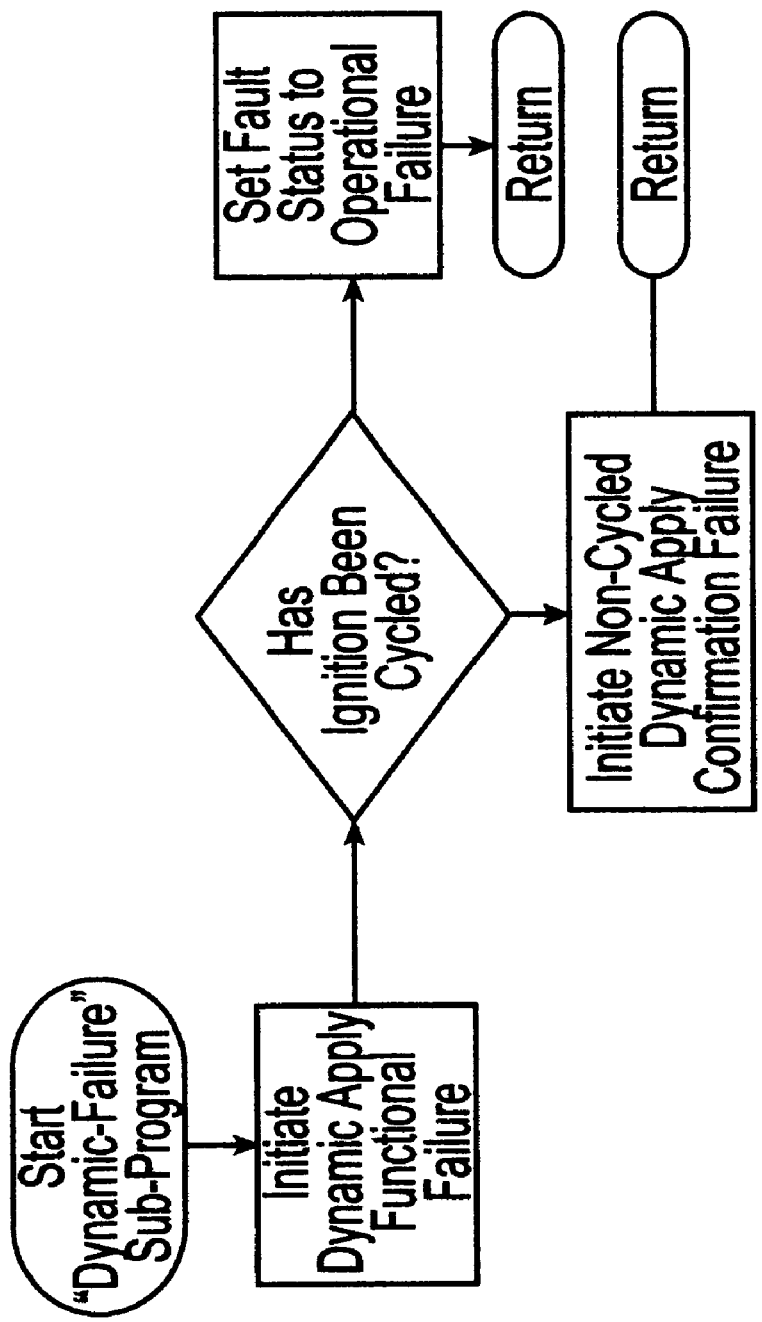
FIG. 11 is a flow chart of the Dynamic Failure sub-program
Figure 12:
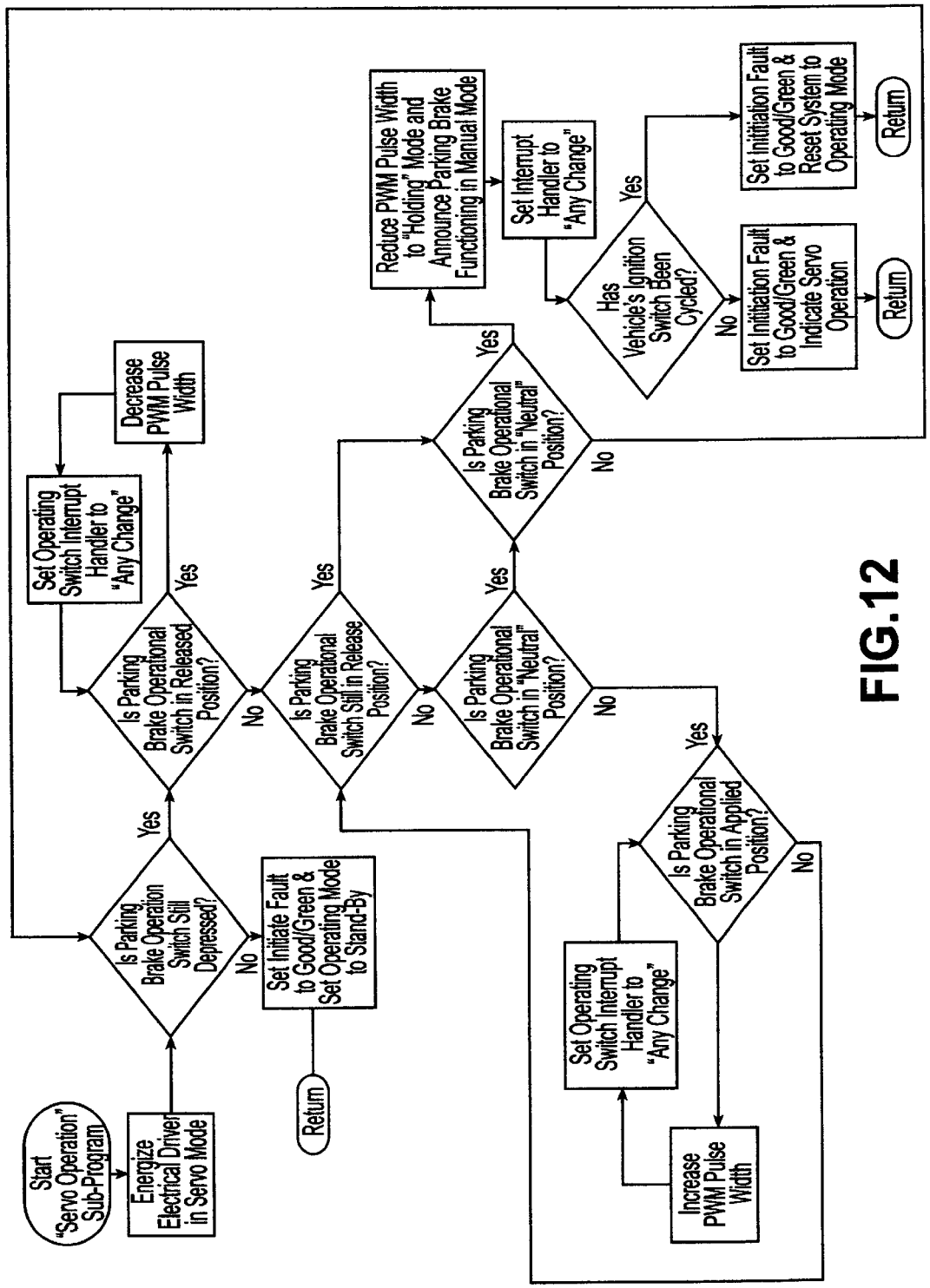
FIG. 12 is a flow chart for the Servo Operation sub-program
Figure 13:
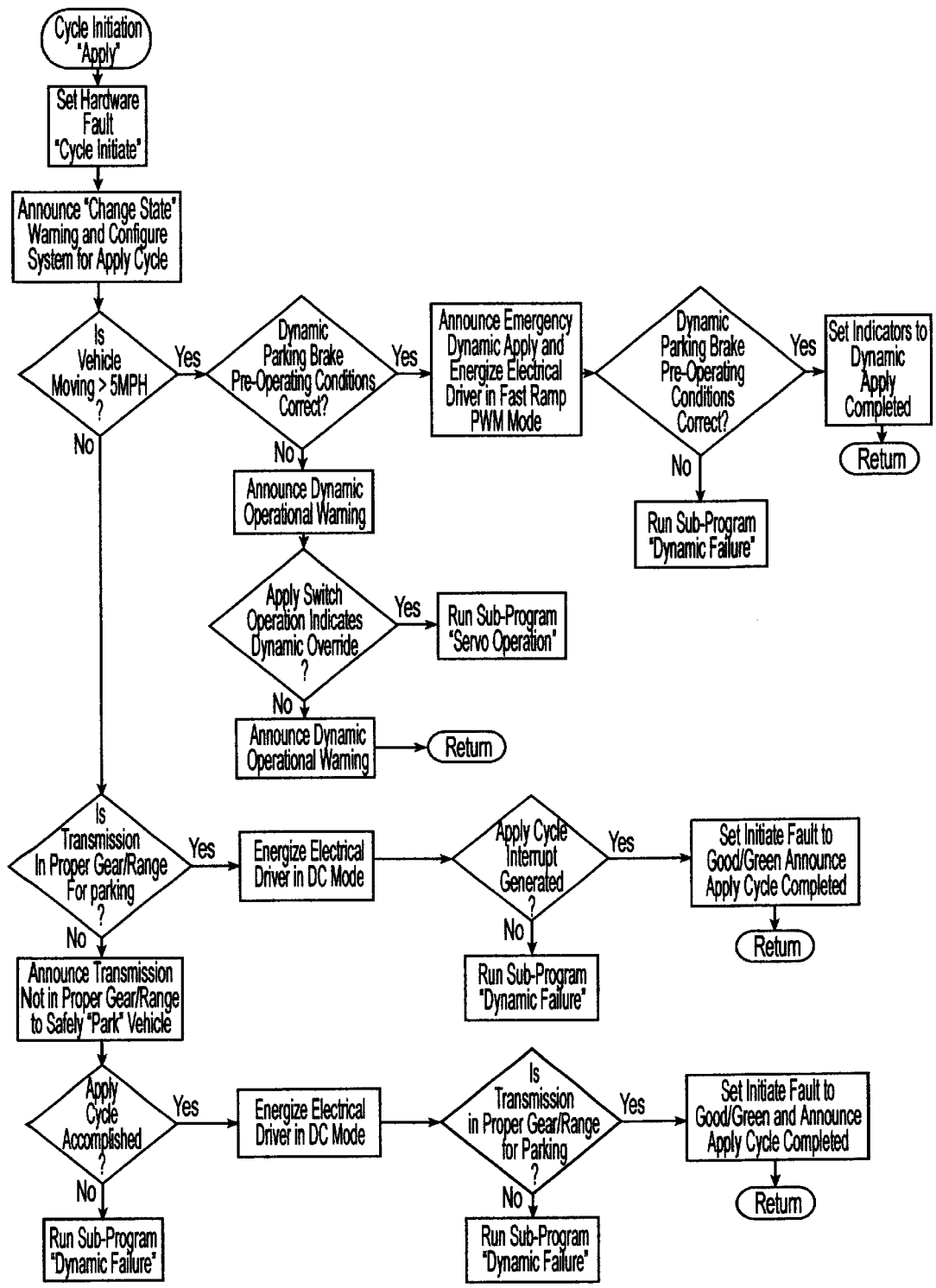
FIG. 13 is a flow chart for the DC-Mode sub-program
Figure 14:
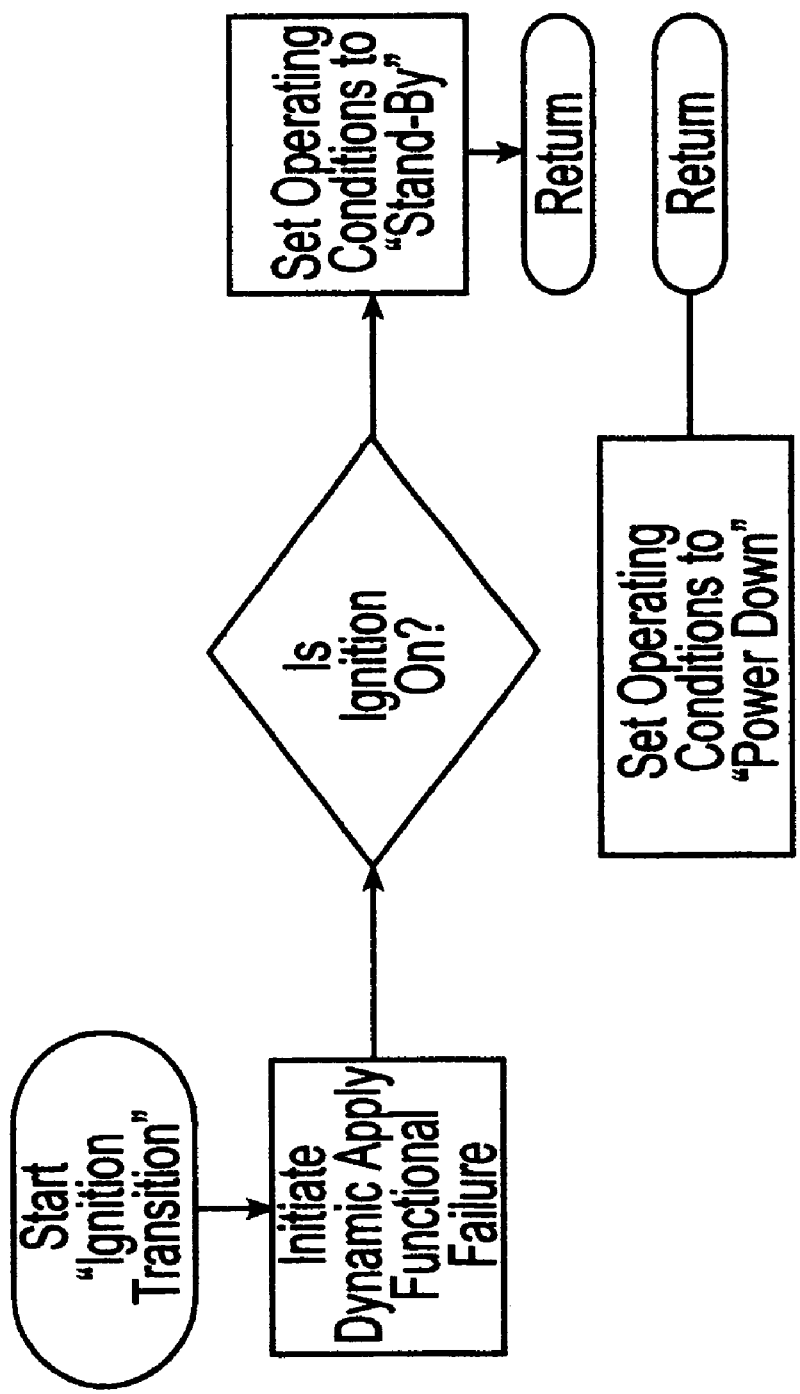
FIG. 14 is a flow chart for the Ignition Transition sub-program
Figure 15:
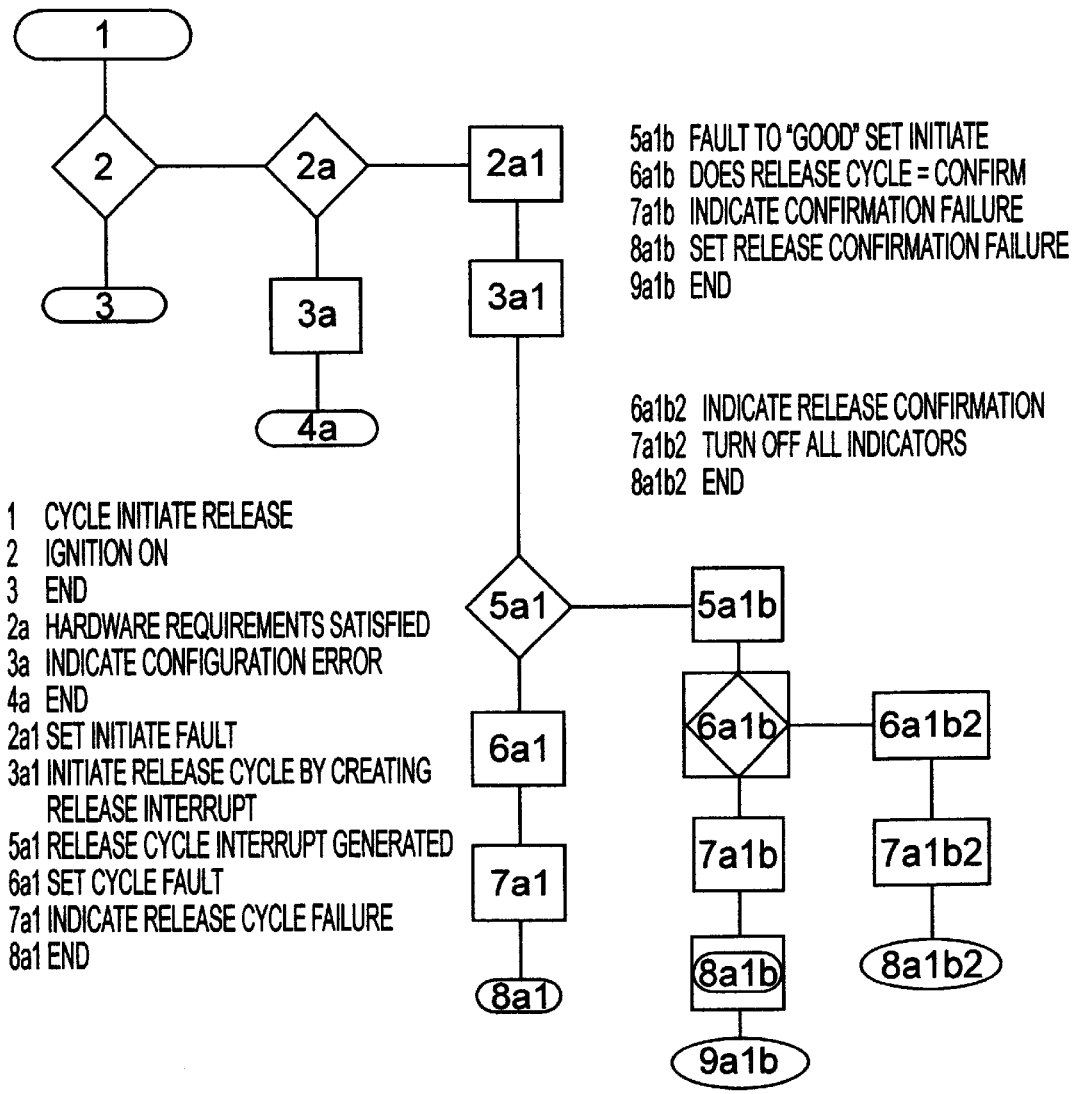
FIG. 15 is a flow chart of the release operating program

In a preferred embodiment of the invention shown in FIG. 4, the Control Means/System 100 receives inputs from a dash or console mounted Operating Switch 108 and inputs from Vehicle/Brake Parameters. The dash or console mounted Switch Operator 108 provides apply/release contact closure information to the Control Means/System by buss 107. Power to operate the switch illuminators is also supplied to the Switch Operator 108 by buss 107 from the Control Means/System 100. In a preferred embodiment of the invention, switch illumination is performed by using bi-color Light Emitting Diodes, LEDs, behind the switch operators allowing individual control of color of each section of the operating switch. Each switch operator illuminator can be turned On/Off or light Red or Green allowing the microcontroller, operating program, to control the illumination of the operating switch. The dash mounted Parking Brake UnSafe Indicators 400 and 401 are illuminated by a similar method which is also controlled by the operating program within the microcontroller. The Fault Indicator within the dash mounted indicator assembly 401 is turned On by a logic circuit that is activated by a contact closure within the Switch Operator 108. Depressing either the apply or release switch causes the Fault Indicator to indicate RED. The operating program within the microcontroller also controls the operation of the Fault Indicator being able to turn it ON and to control the color of illumination. The microcontroller turns Off the Fault Indicator once it has determined that an operational cycle has been completed and the position of the brake is correct. Cycling the ignition switch turns Off the indicator preventing the indicator from drawing excessive power from the vehicle's electrical system preventing the battery from being depleted.

Vehicle Systems 502 composed of Vehicle/Brake Parameters 110 and Vehicle Sub-Systems 112 functions as a transceiver providing/sending signals between the various electrical systems within the vehicle. Vehicle Systems 502 performs interface functions for three types of signals: 1) sending signals to various internal components of the Control Means/System 100; 2) receiving signals from various components of the Control Means/System 100; and 3) providing signal pairs, current source and return path between Vehicle Systems 502 and the Control Means 100.

The Power Supply 501 within the Control Means/System 100 conditions and reduces incoming electrical power, preferably 12/13.8 volts, provided by conductor 500 from the Vehicle/Brake Parameters 110 within Vehicle Systems 502 to voltage/current levels necessary to operate the semiconductor components of the unit. The functional elements within the Control Means/System 100 contain these semiconductor and logic elements supplied by conductor 532 which is under control of the operating program running within the microcontroller in the Electronics Control Unit (ECU) 516.

Electrical power from the vehicle's battery (electrical system) provided by conductor 500 from Vehicle/Brake Parameters 110 within Vehicle Systems 502 provides operating power for the Switch Operator 108, Power Supply 501, Parking Brake UnSafe Module 512, and Electrical Driver (Internal) 520. An Output Power Buss, 532, from Power Supply 501 provides operating power for the logic elements of the various electrical elements within the Control Means/System 100. The Power Supply conditions the vehicle's electrical power to produce an uninterrupted, unswitched, source of power on conductor 507 for operating the Electronics Control Unit (ECU) 516 and the apply switch contacts within the Switch Operator 108. A bi-directional Power Supply Control Buss 504 between the Electronics Control Unit (ECU) 516 and the Power Supply 501 contains the secondary power supply enable signal, RCO, and microcontroller ReSet signal, MicroRST.

The active low secondary Power Supply enable signal, RCO places operation of the second regulated 5.0 volt power supply and the regulated 8.0 volt power supply under control of the microcontroller and its operating program. The 8 volt portion of the secondary power supply within the primary Power Supply 501 provides power, SW+8VDC, to operate the directional control relays within the Electrical Driver 520 and provides operating power for the Audio Module by conductor 505. These two power supplies are only enabled/activated when the operating program requires operation of that particular module/function. This power saving feature reduces drain on the vehicle's electrical system when the system is not in use, on-line. Power Supply 501 contains a microprocessor supervisor that monitors input voltage and microcontroller power supply for low voltages.

The supervisor is set to produce a microcontroller reset, MicroRST, if the Power Supply 501 input voltage falls below 8.38 (8.375) volts or if the microcontroller supply voltage on buss 506 drops below 4.65 volts. This bi-directional buss (506) also contains the enable signal produced by the microcontroller to control the operation of the secondary power systems within the Power Supply.

The Power Supply 501 contains several voltage regulators and a microprocessor supervisor. The Power Supply produces a constant unswitched 5.0 VDC, primary power, to power the microcontroller within the Electronics Control Unit (ECU), microprocessor supervisor located within the Power Supply, transmission signal translator within the Sensor/Interface Systems, and to provide an active high signal to the Switch Operator 108 for operation of ignition Off static apply by conductor 507. A second, or secondary power system under control of the microcontroller, produces Switched/Enabled 5.0 VDC power, EN+5VDC, and Switched/Enabled 8.0 VDC power, SW+8VDC, used to operate the directional control relays of the Electrical Driver (Internal) 520 and to provide power for the audio amplifier residing within the Audio Module 508 by conductor 505. This division of power within the secondary supply allows the relays, an inductive device, to have a dedicated supply of their own eliminating interface/spikes on the microcontroller and logic power supplies/lines. Switched/Enabled 5.0 VDC power, EN+5VDC is provided to the Audio Module 508 by conductor 504 where it powers the low power pre-amp's and verbal message center within the Audio Module 508. The verbal message center is controlled by input/output (I/O) buss 111. Messages pertaining to the safety and operation of the electrically operated parking brake-by-wire system are used to provide the driver/user with information pertaining to the use, operation, and status of the vehicle's service brake system and electrically operated parking brake-by-wire system.

The Parking Brake Unsafe Module 512 generates a signal, ECURESET, a component of buss 503, that is used to reset the microcontroller within the Electronics Control Unit (ECU) 516 if the vehicle's starter is engaged three or more times without starting the engine without turning the ignition to Off during the process. Vehicle/Brake Parameters 110 within Vehicle Systems 502 provides a signal, VEH-STRT, pertaining to the status of the vehicle's starter and an ignition status signal, Ign-On, on buss 300 to the Sensor/Interface Systems 518 which conditions the signals for use by the logic elements within the Control Means/System 100. Conditioned starter and ignition information supplied by Sensor/Brake Systems 518 on buss 519 provides the Parking Brake Unsafe Module with information that is used to reset the microcontroller and other logic elements within the Control Means 100 if the starter is engaged three or more times without starting the engine. Battery/Vehicle Power (12/13.8 volts) supplied/controlled by the vehicle's Ignition Switch (Active, high, when vehicle's Ignition Switch is On) as signal IGN+12V, is supplied by Vehicle/Brake Parameters 110 within Vehicle System 502 to the Parking Brake UnSafe Module 512 as part of buss 300/519 along with a signal pertaining to the status of the vehicle starter also as a component of buss 300/519. The IGN-Test signal provided by Vehicle Systems as part of buss 300 and 519 tests the dash mounted 'Brake' indicator in a similar manner as conventional parking brake systems.

Vehicle/Brake Parameters provide the Control Means/System with electrical power from the vehicle's battery/electrical system by conductor 500. Buss 301 provides transmission gear/range select lever, ignition switch status/usage, wheel speed pulse(s), and remote parking brake operation information from vehicle for processing by the Sensor/Interface Systems 518. Information pertaining to the status of the driver side door is provided to Sensor/Interface Systems by conductor 302. Vehicle operational information pertaining to oil pressure and service brake operation/status are provided to Sensor/Interface Systems by buss 521. Buss 300 provides ignition status, ignition test signal, and information pertaining to the vehicle's starter to the Sensor/Interface Systems 518.

Sensor/Interface Systems performs two types of processing on incoming signals. Signals supplied to generate active interrupts with the microcontroller, signals which are effectively on-line all the time, only produce/require power in their active state such as service brake operation. Their normal operating condition is "Off", not requiring or producing power. Active circuits, circuits producing/requiring power when 'Off' were conditioned in a second section of the Sensor/Interface Systems that only functioned when the vehicle was 'on-line' (ignition On or Key in ignition switch for over 30 minutes).

Vehicle/Brake Parameters 110 within Vehicle Systems 502 provides transmission range/gears select information to a transmission signal translator within the Sensor/Interface Systems 518 by buss 301. Unswitched electrical power provided by conductor 507 provides operating power for the conditioning circuits associated with buss 301. The conditioned signals, transmission gear/range select lever information, ignition switch status/usage, wheel speed pulse(s), and remote parking brake operation are provided to the Primary Direct Acting Interrupts 536 within the Electronics Control Unit (ECU) 516 by buss 523.

The transmission signal translator processes/conditions signals provided by the transmission, thereby in an embodiment of the present invention changing the 7-Line Decimal (1-of-7) active high (12/13.8 VDC signal to a 3-Bit Binary Coded Digital (BCD) signal that is compatible with the 5-Volt TTL signal levels used by Control Means/System. The translator, transmission interface, performs a straight data conversion with no offset; thus, the 3-bit data word for the vehicle parked position will be all 'zero's'. If the vehicle is parked correctly, transmission in the correct range/gear for recommended parking, the output of the translator will be 'zero', or no voltage output. This special consideration allows unswitched power to be used in the conversion process, signal conditioning/conversion of the transmission data, without creating excessive electrical drain on the vehicle electrical systems when the vehicle is correctly 'parked'.

Buss 523 provides the two least significant bits of converted transmission data to the interrupt section of the microcontroller. If the vehicle is parked correctly, in the recommended range/gear, the 2-bit transmission data word provides all zero's to the interrupt section of the microcontroller. This data word is only examined/active when the vehicle is 'parked' with the ignition key removed. If the transmission range/gear select lever is moved/changed while the vehicle is parked, the change in the status of the data word will create an interrupt which will cause a program to 'execute' applying the parking brake and sounding the vehicle's horn.

Transmission range/gear select information is used to determine what type of audio warning is sounded upon initiation of a parking brake operational cycle and used in dynamic apply as part of the pre-operating conditions. If the vehicle is in a gear/position to generate powered movement of the vehicle, activation of the audio warning would be longer and higher in intensity than if the systems was in a 'park' or 'neutral' position.

If there is a dynamic apply cycle initiated with an indicated service brake failure, the operating program running within the microcontroller checks transmission position to determine if the transmission is NOT is the highest drive gear/range allowing the Control Means/System to apply the brake in an emergency dynamic mode. If there is a dynamic apply initiated when the service brakes indicate they are functional, audio and visual warnings are produced and if the operating program determines that a dynamic over-ride is indicated, the Control means/System applies the parking brake in a dynamic over-ride mode. The dynamic over-ride mode can be either automatic using a 'slow' ramp brake apply mode or function in a 'servo' mode allowing the user/operator to manually control the brake application force. Transmission signal translator within the Sensor/Interface Systems 518 provides an ignition enabled ground, IGN-GND, that is also used as part of the ignition interlock system within the Switch Operator 108 for releasing the parking brake by conductor 533.

Vehicle speed information is used in defining the operating mode for the electrically operated parking brake-by-wire system, either static or dynamic operating modes. The speed sensor conditioner/interface circuitry, a clipper circuit, within the Sensor/Interface Systems is designed to produce a microcontroller interrupt when the vehicle moves when it is in a stand-by condition (Ignition Off with key removed). The Speed sensors are a special 2-phase bi-polar sensing unit with a slight overlapping of the phases. With a bi-polar output and slightly overlapping phases, a strong pulse can easily be detected/amplified at very slow vehicle speeds. This bi-polar pulse can also be used to detect direction of vehicle movement. When the ignition is On and the vehicle in a gear/range to produce powered movement, an attenuator reduces the output of the special speed sensors preventing the sensor output from overloading the monitoring circuits of other vehicle systems, ABS.

The ignition-key/door interlock interface on the vehicle provides the driver/user of the vehicle a warning that the Ignition Key has not been removed from the Ignition Switch when the driver side door is opened. This warning is usually in the form of a chime or buzzer. The circuitry preferably includes a driver side door switch with normally open contacts where one set of contacts are connected to ground, a relay, and a key-in-place switch connected to the steering column locking pin. If an ignition key is in the ignition switch the key in-place switch contacts close providing vehicle voltage to the relay coil. When the driver's side door is opened, the door switch contacts close completing the circuit. The Control Means/System uses portions of this circuit along with an ignition status signal to generate three signals pertaining to the status of the driver's side door and ignition switch. A signal that indicates that an ignition key is in the ignition switch is used in determining if the vehicle is occupied.

Using the Ignition-Key/Door Interlock Interface to generate power for operating certain electrical functions within the Control System allows the generation of power with the Ignition Off while still providing a means of shutting down the system without excessive drain on the vehicle's battery. (Removal of the Ignition Key is a better indication that the vehicle is shutting down than turning Off the Ignition). When an ignition key is placed in the ignition switch, the ignition-key/door interlock interface produces a vehicle based active high (+12/13.8 volts) that is used to power a secondary voltage regulator within the Power Supply to produce regulated +5.0 volts used to power the Powered Change State Detector.

Using the ignition-key/door interlock circuitry to provide operating power for portions of the electronics has the advantage of keeping circuits active with the ignition switch Off but still allowing total shut-down (removal of ignition key from the switch) when the vehicle is placed in the stand-by mode, parked. This is especially helpful in the handling of class II interrupts, interrupt created by the Powered Change State Detector.

Ignition status provides signals to the upper portion of the Sensor/Interface Systems for use in creating a direct acting microcontroller interrupt. The ignition status signal supplied to the lower portion of the Sensor/Interface Systems is used by the Parking Brake UnSafe Module to generate a reset signal for the fault monitor and microcontroller.

When the Powered Change State Detector is unpowered (no ignition key present in ignition switch or key left in switch 30 minutes after ignition turned Off), turned Off, the Open Door Detector output is transferred to the output of the Interrupt Handler where an open driver's door indication will generate a primary direct acting interrupt at the interrupt port of the microcontroller. At the generation of an interrupt at this port, the operating program within the microcontroller checks the status of the key in ignition port to see if the Powered Change State Detector is powered in order to determine how to process the interrupt at this port. When the Powered Change State Detector is powered, ignition key present or has been present within the last 30 minutes, an interrupt at the driver side door open interrupt port is processed as an change in status/state in one or more of the input signals to the Powered Change State Detector. A special logic circuit within Sensor/Interface System transfers the driver side door open signal to the output of the Sensor/Interface System when the Powered Change State Detector is unpowered.

The Sensor/Interface Systems 518 receives signals from Vehicle/Brake Systems 110 within Vehicle Systems 502 pertaining to at least one of the following: 1) transmission range/gears select information; 2) key status of the ignition switch; 3) vehicle speed; 4) remote brake application; and 5) ignition status. These signals are processed/conditioned by Sensor/Interface Systems 518 and supplied to the Primary direct Acting Interrupts 526 unit within the Electronics Control Unit (ECU) 516 as buss 523. These signals combined with signals for the Switch Operator 108 and Powered Changes State Detector 517 generate the interrupts required for operating the Control Means/System when the vehicle is shut down, 'off-line'.

The Sensor/Interface Systems 518 receives signals from Vehicle/Brake Systems 110 within Vehicle Systems 502 pertaining to at least one of the following: 1) presence of oil pressure; 2) operational status of the service brake system; and; 3) service brake application data. These signals are processed/conditioned by Sensor/Interface Systems 518 and supplied to the Powered Change State Detector 517 by buss 528. These signals combined with a release cycle initiate signal from the Switch Operator 108 generate a level/class II interrupt on the shared driver side door static interrupt line required for operating the Control Means/Systems when the vehicle is 'on-line'.

The Sensor/Interface Systems 518 receives signals from Vehicle/Brake Systems 110 within Vehicle Systems 502 pertaining to the presence of oil pressure. Sensor/Interface System processes this information converting it to a logic form that is useable by the microcontroller within the Electronics Control Unit (ECU). The conversion circuit is able to process/condition data from either an oil pressure sensor or an oil pressure monitor. The presence of oil pressure is used as one of the pre-operating conditions for dynamic application of the electrically operated parking brake system.

The Sensor/Interface Systems 518 receives signals from Vehicle/Brake Systems 110 within Vehicle Systems 502 pertaining to the operation/application of the service brakes. Sensor/Interface System processes this service brake application signal converting it to a logic form that is useable by the Powered Change State Detector 517. Sensor/Interface Systems 518 within Vehicle Systems 110 provides service brake data by conductor 534 for use by the Switch Operator 108 as one of the operating pre-conditions for parking brake release.

The Sensor/Interface Systems 518 receives signals from Vehicle/Brake Systems 110 within Vehicle Systems 502 pertaining to the operating status of the service brakes. An indicated service brake failure such as excessive pressure differential between the two hydraulic systems of the service brakes and/or low brake fluid will result in the generation of an interrupt at the Primary Direct Acting Interrupt Handler 526 within the Electronics Control Unit (ECU) 516. This signal is used in conjunction with the operation of the parking brake-by-wire system to allow the parking brake-by-wire system to function as an 'emergency' brake while still preventing inadvertent or inappropriate operation of the parking brake-by-wire system.

With the Powered Change State Detector functioning, any change in the status of: 1) release switch operator; 2) presence of oil pressure; 3) operational status of service brake; 4) status of driver side door; or 5) application of service brakes; will create an interrupt on the shared driver side door static interrupt line. The Active I/O 527 unit within the Electronics Control Unit (ECU) 516 generates a signal on the I/O buss 111 provided to the Powered Change State Detector that disables/prevents service brake application information from generating an indirect interrupt through the Powered Change State Detector. This inhibit signal prevents generation of an interrupt at each application of the service brake.

The Sensor/Interface Systems 518 receives signals from Vehicle/Brake Systems 110 within Vehicle Systems 502 pertaining operating status of the vehicle's ignition switch and the vehicle's starting system. Sensor/Interface Systems provides this information to the Parking Brake UnSafe Module 512 with buss 519. Information pertaining to the status of the vehicle's ignition switch is extracted from buss 519 and placed on conductor 620 within the Parking Brake Module 512 Indicator. Information pertaining to the status of the vehicle's starting system is placed on conductor 619 and provided to Ignition Reset 600 within the Parking Brake UnSafe Module 512. Information pertaining to the status of the ignition switch present on conductor 620 is provided to the Power Conditioner 601, Over-Ride Luminator 608, and Ignition ReSet 600.

Bi-directional buss 535 between the Active I/O module within the Electronics Control Unit (ECU) 525 and the Parking Brake UnSafe Module contains a tri-state signal pair from the Active I/O whose state/status is controlled by the Operating Program running within the microcontroller containing information pertaining to the fault status of the memory element within the Parking Brake UnSafe Module 512. This bi-directional buss is used to: 1) extract fault information from the Parking Brake UnSafe Module; 2) set the fault status/condition of the non-volatile fault memory element within the Parking Brake UnSafe Module 512; and 3) reset the hardware induced initiate fault placing illumination control of the dash mounted fault indicator under software control.

The inputs/outputs to/from the Active I/O 527 within the Electronics Control Unit (ECU) 516 are classified as either inputs or outputs. The input condition of an input port places the port at a high impedance state, high resistance. The output function of a port is described as being current sink/source devices. In an output state of Off, they are capable of sinking, acting as ground for current levels up to 20–25 mA. In an output state of On, the port is capable of supplying 20–25 mA. With three effective port states, microcontroller output, Active I/O, is described as being tri-state. In a preferred embodiment of the invention, wide use of the multiple states of the input/output ports is used to reduce the number of I/O lines to the microcontroller.

Buss 535 is preferably a 2-bit tri-state buss used to provide three separate and distinct functions. A positive signal differential is used to reset the initiate fault and to place illumination of the dash mounted 'Fault' lamp under software control and to reset, cancel, the residual fault condition in the Fault Memory Element 617. A negative signal differential on the signal pair is used to light/turn the dash mounted 'Fault' light Red and to reset the Fault Memory Element 617 to a fault condition. When the buss is in its high impedance input state, it is able to read the status of the Fault Memory Element 617.

Within the Parking Brake UnSafe Module 512, buss 535 is supplied to Bias Detector (Positive) 611, Bias Detector (Negative) 612, Signal Pair Bias Network 615, and the Bi-Polar Pulse Driver 616. Signal Pair Bias Network 615 places information pertaining to the status of the Fault Memory Element 617 on the tri-state buss 535. Current limiting resistors within the Signal Pair Bias Network 615 limits the current flow to/from the microcontroller port when it is in an output state, sinking/sourcing power while also functioning as a bleed resistor for the Bi-Polar Pulse Driver 616. If the bi-polar signal pair on buss 535 is positive, Bias Detector (Positive) 611 will pull/bring conductor 636 high. If the bi-polar signal pair on buss 535 is negative, Bias Detector (Negative) 612 will pull/bring conductor 634 high providing the second input to Exclusive OR-Gate 613. An active high provided by conductor 636 to the Open Collector Driver 610 will produce an active current sink at its output, conductor 618. Steering diodes (not shown) within the Initiate Fault Memory Element 606, allow: 1) both the primary and secondary coils to be energized when conductor 618 is pulled low by the open-collector output of the Open Collector Driver 610; and 2) only the primary coil to be energized when conductor 640 is pulled low by the open-collector output of the Ignition ReSet 600.

If the bi-polar signal pair on buss 535 is negative, Bias Detector (Negative) 612 will pull/bring conductor 634 high. The Exclusive OR-Gate 613 processes dissimilar inputs providing a high output on conductor 637. The Delay Module 614 delays the positive going signal slightly providing the delayed signal on conductor 638 which is supplied to the LED Color Controller 607. The delay in the color control signal allows the Over-Ride Luminator 608 to change power sources without the change-over flicker. The output of the Delay Module 614 provides an open-collector current sink on conductor 638 for LED Color Controller 607.

The Bi-Polar Pulse Driver 616 produces a pulse of the same polarity as the incoming signal in buss 535 upon a transition or the changing of polarity of the signal pair on buss 535. The pulse driver reduces the drain on the microcontroller port from the Fault Memory Element (Bi-Polar Coil) 617 when a differential signal pair is used to control the color of the LED within the Dash Mounted 'Fault' Indicator 609. The bi-polar pulse produced by the Bi-Polar Pulse Driver is placed on conductor sets 633 and 632 which provide a bi-polar pulse to set/reset the Fault Memory Element (Bi-Polar Coil) 617. The Fault Memory Element (Bi-Polar Coil) 617 provides an output to conductor 631 in relation to the status of the fault memory. Signal Pair Bias Network 615 places this relationship on the residual fault 2-bit data word buss 535 as a non-differential signal allowing the microcontroller to sample either signal pair to obtain the status of the memory element residing within the Fault Memory Element (Bi-Polar Coil) 617.

Activation (contact closure) of the apply switch operators within the Switch Operator 108 causes a current flow through the Apply Optical Isolator 603. Conductor 628 provides a ground return path for electrical power produced by either the Power Conditioner 601 or unswitched power supplied through Blocking Diode 602 through the Apply Optical Isolator 603 and apply switch contacts within the Switch Operator 108. Power Conditioner 601 conditions/reduces electrical power provided by the vehicle's ignition circuit to approximately 5.1 volts when the ignition is On. The conditioned power is isolated with steering diodes (not shown) within the Power Conditioner 601 and supplied to conductors 621 and 635. Conductor 621 provides either electrical power conditioned by the Power Controller or electrical power provided by an unswitch power source through Blocking Diode 602 to: 1) set coils, primary and secondary memory elements, within the Initiate Fault Memory Element 606; 2) collector of the Release Optical Isolator 604; and 3) collector of the Apply Optical Isolator 603. Conductor 635 provides conditioned, and isolated, electrical power from the Power Controller 601 to the reset coils, primary and secondary memory elements, of the Initiate Fault Memory Element 606. Initiate Fault Memory 606 provides a master color control signal to LED Color Controller by conductor 630. The Initiate Fault Memory Element 606 receives LED color control information for the Fault Memory Element 617 by conductor 631. If the Initiate Fault Memory Element is set to indicate an initiate fault, the master color control signal is set to Red. If only the primary Initiate Fault Memory Element is reset by cycling the ignition switch, the master color control signal indicates/instructs the LED Color Controller 607 to provide the Over-Ride Luminator to display a Red/Fault condition by conductor 639. If the microcontroller resets both the primary and secondary memory elements with the Initiate Fault Memory Element 606, the master control color will be the equivalent of the color indicated by the Fault Memory Element 617.

When the ignition is Off, unswitched electrical power provided by conductor 503 from the Power Supply 501 within the Control Means/System 100, is transferred through Blocking Diode 602 and placed on conductor 621. Conductor 621 provides electrical power to Optical Isolators 603 and 604, and to the set and reset coils of Initiate Fault Memory Element (Dual Coils) 606. Design/functional reliability is insured with two sources of operating power for the apply initiate fault circuit in a preferred embodiment of the invention; a secondary source of electrical power is provided by the ignition circuit for the apply function of the Control Means/System.

Activation (contact closure) of the release switch operator within the Switch Operator 108 will cause a current flow through the Release Optical Isolator 604 if the associated current return path electrical circuit is functional, pre-operating conditions met. In a preferred embodiment of the invention, activation, depression of the service brake pedal until the stop/brake lights with the vehicle's ignition On, is a prerequisite for initiating a release cycle for the electrically operated parking brake-by-wire system. Raw service brake data, 12/13.8 volt electrical signal, is supplied to the Service Brake Interlock 605 by conductor 534. The ignition ground reference signal supplied by conductor 533 provides the ground return circuit path when the ignition switch is On. With the ignition On and the service brake depressed, activation of the release switch will result with a current flow through conductor 629 completing the circuit path.

With the activation of the apply switch, contact closure, current/power provided by conductor 621 forward biases the light emitting diode (LED) within the Apply Optical Isolator 603 passing through conductor 623, through closed apply switch contacts of Switch Operator 108 and to ground by conductor 628. When the Optical Isolator LED is forward biased, the opposing phototransistor also conducts allowing current to flow from the collector to the emitter of the phototransistor. The collectors and emitters of the phototransistors within the Optical Isolators are wired together to form a 2-input OR-Gate. Forward biasing either of the optical isolators inputs will result in current flow through the hard wired phototransistor resulting in setting the Initiate Fault Memory Element 606 to a 'Set' condition.

The collectors of the apply/release optical isolators are connected together with conductor 622 forming part of the circuit path for the initiate fault activation circuit. With the emitter of the Apply Optical Isolator 603 connected to ground by conductor 624 and conductor 627 providing the ground return path for the emitter of the Release Optical Isolator 604. With the activation of the release switch, contact closure, current/power provided by conductor 621 forward biases the light emitting diode (LED) within the Release Optical Isolator 604 passing through conductor 626, through closed release switch contacts of Switch Operator 108 and to Service Brake Interlock 605 by conductor 629.

The Initiate Fault Memory Element preferably contains two non-volatile memory elements, a primary and secondary memory element. Both memory elements are set to a fault condition by an electrical contact closure from the functioning electrical circuit (pre-operating conditions met) of the switch contacts located within the Switch Operator. A reset signal produced by the Ignition ReSet 600 when the ignition switch is cycled only resets the primary memory element to a non-fault status. The secondary memory element retains the initiate fault setting during an ignition reset allowing an initiate fault to be displayed when the ignition switch is turned On. In this preferred embodiment of the invention, a fault indication resulting from a contact closure of a functioning electrical circuit where the pre-operating conditions have been met can be displayed even if the microcontroller and/or operating program has failed. Allowing the microcontroller to reset both memory elements cancels the initiate fault indication and provides the operator/user an indication of the functionality of the microcontroller and its operating program. In a preferred embodiment of the invention, the operating program running within the microcontroller resets the initiate fault as its last function before returning to its interrupt monitoring routine.

With the Initiate Fault Memory Element 606 contacts in a 'Set' position, power is placed on the on conductor 625 which causes the Over-Ride Luminator 608 to switch the source of illumination power to shunt regulated vehicle power, and to provide a ground return path for the LED driving current. Once the microcontroller resets the Initiate Fault Memory Element 606, the Operating Program 525 running within the Electronics Control Unit (ECU) 516 has control of the illumination and color of the dash mounted 'Fault' LED through the setting of the Fault Memory Element 617. The setting/status of the Fault Memory Element 617 controls the color of the 'Fault' LED while the microcontroller controls the illumination, turning ON/Off.

Buss 641 provides a ground return path and power conductors for each LED color within the Dash Mounted 'Fault' Indicator 609. The dash mounted indicator is either a bare LED or an indicator composed of a 'Fault' placarding with the LED providing backlighting to illuminate the indicator. The LED can be a single high output bi-color device or composed of an array of multiple LEDs. In a preferred embodiment of the invention, the fault indicator and switch illuminators are composed of bi-color LEDs allowing the color of the display to be changed under control of the software.

The Over-Ride Luminator 608 provides power from the vehicle's ignition system by conductor 620. The Initiate Fault Memory Element 606 provides an over-ride enable signal to the Over-Ride Luminator 608 by conductor 625 when the Initiate Fault Memory Element 606 is set to indicate an initiate fault, activation of a switch operator (contact closure) within the Switch Operator 108. Residual fault status supplied by conductor 631 from the Fault Memory Element 617 is displayed on the dash mounted 'Fault' indicator when the ignition switch is turned On. Cycling the ignition switch, changing switch position either to 'start' or Off, turns off the indicator and resets the Initiate Fault Memory Element 606 preventing the initiate fault circuitry from withdrawing excessive power from the vehicle's electrical system preventing the battery from being depleted.

The Switch Operator preferably contains: 1) the operating switch (Apply—Release Switch) that operates the electronics that control the operation of the parking brake-by-wire system; 2) bi-polar luminous drivers to control the direction and current flow to drive the bi-color LEDs within the switch operators 3) switch debounce circuitry, switch illuminators (lights), and the microcontroller interface electronics, resistors, to reduce the ESD signature into the microcontroller; 4) hardware circuitry to perform level 1 pre-conditions, interlocks, for operating the parking brake-by-wire system; and 5) hardware circuitry to produce/generate the initiate fault upon any switch contact closure.

The Switch Operator receives operating power from several sources and provides a switch contact closure. The configuration of these power sources and ground return paths generate/allow the creation of operating pre-conditions for the Control Means/System and provide reliable operation in the event of a power supply failure. With the apply circuit having no operating pre-conditions, activation of the apply switch operator within the Switch Operator creates an active low which is sent to the Primary Direct Acting Interrupt Handler 526 within the Electronics Control Unit (ECU) by conductor 531 generating an interrupt at the microcontroller upon activation of the switch. This contact closure signifies the initiation of an apply operational cycle of the electrically operated parking brake-by-wire system.

If the correct pre-conditions are met for a release cycle, activation of the release switch operator within the Switch Operator creates an active low which is sent to the Powered Change State Detector 517 by conductor 513. In a preferred embodiment of the invention, service brake activation was established as an operating pre-condition for a release cycle. If the ignition is ON, the Powered Change State Detector will be active and activation of the release switch with the service brake pedal depressed where the brake/stop lights come On, an active low will be transferred from the Powered Change State Detector to the Primary Direct Acting Interrupt Handler 526 within the Electronics Control Unit (ECU) by conductor 535 creating an interrupt at the microcontroller interrupt port. This interrupt will initiate a release cycle with completion based upon the software pre-operating conditions.

However, if the correct pre-conditions are met for a release cycle, service brake application, activation of the release switch operator within the Switch Operator creates an active low which is sent to the Powered Change State Detector 517 by conductor 513. If the ignition is Off with a key present in the ignition switch, the Powered Change State Detector will be active and activation of the release switch with the service brake pedal depressed where the brake/stop lights come On, an active low will be transferred from the Powered Change State Detector to the Primary Direct Acting Interrupt Handler 526 within the Electronics Control Unit (ECU) by conductor 535 creating an interrupt at the microcontroller interrupt port. This interrupt will initiate a release cycle but software operating pre-conditions, ignition Off, will terminate the release cycle after audio warning are sounded The luminous drivers light the appropriate switch operator if that function is available, active, with vehicle's Ignition On (or key in the Ignition Switch for less than 30 minutes) or the luminous driver illuminates the function after the switch is depressed if the function is available with the ignition Off (static apply). Illumination of the switch operator within the Switch Operator 108 is under control of the operating program running with the Operating Program 525 within the Electronics Control Unit (ECU) 516. The operating program manipulates two signal lines within the I/O buss 111 controlling the color and illumination of each of the switch illuminators behind the operating switch.

The Switch Operator receives unswitched 5.0 volts regulated power from the Power Supply by conductor 507 and back-up operating power from the vehicle's electrical system by conductor 500. The wiper arm of the Apply portion of the toggle switch is connected to ground, an active low TTL signal source. A contact closure on the Apply portion of the switch operator will pull the microcontroller I/O line low resulting in generating a microcontroller interrupt starting the initiation of an operating cycle, Apply. Once an Apply cycle has been initiated, the operating program within the microcontroller determines if the vehicle is moving and if it is moving forward. If the vehicle is in the static mode, not moving, the operating program sounds a pre-operating signal and applies the parking brake-by-wire system.

If the release portion of the Switch Operator is depressed, the release electrical circuit will not be complete until the operating pre-conditions are met ignition ON and service brake depressed/engaged. Once these initial pre-operating conditions are satisfied, the Release electrical circuit will be functional allowing the Powered Change State Detector to transfer the active low to the Primary Direct Acting Interrupt Handler 526 within the Electronics Control Unit (ECU) 516 generating the microcontroller interrupt.

There are two levels of operating pre-conditions. The first level is an operation interlock circuitry requiring certain conditions to be met before the switch contact electrical circuitry is functional. Once the switch contact electrical circuitry is functional, the microcontroller establishes additional pre-conditions, depending upon the operating mode of the vehicle and the braking function requested before completing the requested braking function.

The release cycle operating pre-conditions are determined by the source of power for the release portion of the Switch Operator and the return path for the chosen power source. The system shown uses ignition On, service brake applied, and an active low return path controlled by the ignition switch circuitry. These operating pre-conditions can be changed by simply changing the source of power or return path for the release portion of the Switch Operator circuit.

The Electronics Control Unit (ECU) 516 contains a microcontroller and the associated crystal or resonator which provides the clock signal for driving/operating the microcontroller. The microcontroller contains input/output ports which provide the Primary Direct Acting Interrupt functions associated with function/element 526 and Active I/O associated with function/element 527. The Operating Program 525 running within the microcontroller consists of a main interrupt handling system, level 1 programs, sub-programs, and sub-routines.

The operation of the microcontroller I/O ports is controlled by the operating program running within the microcontroller. The microcontroller functions as a process control computer system, creating a stimulus and waiting for a response, allowing it to control external peripherals (external to the microcontroller) which in turn controls the operation of the parking brake by wire system. The Electronics Control Unit (ECU) 516 may utilize the input/output multiplexing (Multiplexed I/O 525) as supporting systems/methods in order to accomplish the intended tasks of the Control Means/System.

The microcontroller and its associated operating program running within the Electronics Control Unit (ECU) 516 also functions as a power manager, controlling the operation of certain portions of the power supply to minimize the quiescent power consumed in order to prevent excessive battery current when the unit/vehicle is in a standby (parked) condition. The microcontroller is continuously powered drawing current from the vehicle's battery, therefore, the microcontroller power supply and associated circuits are designed to draw the minimum amount of power in its quasi state (standby).

Extensive use of the microcontroller's 'sleep' mode is used when the microcontroller is not actually running diagnostics, operating the parking brake-by-wire system, or monitoring related vehicle systems. Using a process control design/concept reduces the number of active interrupts required for the design to function correctly. Interrupts are used to 'Wake-Up' the microcontroller from its sleep mode, or to interrupt a running/operating program segment, in order to perform a 'higher' priority task. Continuously powering the microcontroller allows the apply function of the parking brake to be available at any time with or without any operating pre-conditions. Ignition and service brake interlocks can be provided by powering portions of the Switch Operator for appropriate power/interface circuits.

The operating program within the microcontroller uses 2-bits of the Active I/O 527 and associated buss 511 to control operation of the vehicle's stop/brake light and cruise control during dynamic operation of the electrically operated parking brake-by-wire system. The Control Means/System produces a signal used to cancel operation of the cruise control and to operate the vehicle's stop/brake light which is provided to Vehicle/Brake Parameters 110 within Vehicle Systems by buss 300/519.

The Electrical Driver is a reversible power controller that provides bi-directional signal pair on buss 101 that provides power and the mating return path power allowing the electrical driver to provide steady state, steady state pulse (+/− or −/+), or pulse width modulated power to correctly and efficiently operate parking brake-by-wire systems. The Electrical Driver uses a cost effective combination of a solid-state master switch means, a solid-state Metal Oxide Semiconductor Field Effect Transistor (MOSFET), and mechanical directional control components, relays, to form a hybrid electrical drive unit that can generate a bi-polar electrical pulse in a cost effective method. The Electrical Driver functions as a master power controller, controlling the application and direction of operating power to the parking brake-by-wire system.

A direction control signal is required to enable one relay of the H-Bridge and a master control signal is required to enable the master switch means. A malfunction in the directional control circuitry will not cause activation of the external parking brake-by-wire system but will effect operation of the unit. A malfunction in the master control means will not cause activation or cause non-operation of the unit but will ultimately effect optimal life expectancy of the electronics. This arrangement of direction control and master control means provides added operational safety and eliminates the inadvertent operation due to impact causing a relay contact closure starting an initiation of an operating cycle.

The Audio Module 508 provides both tonal and verbal messages to the user/operator of the vehicle pertaining to the function, status, and operation of the electrically operated parking brake-by-wire system. The Audio Module provides the driver/user with warning tone(s) of impending change of state of the parking brake system or related vehicle systems. The audio tones consist of dual tones (2 & 3.7 khz.) at two sound intensities for each tone. The MSB-Bit from the Quantum Level Audio Detector controls the application of slightly higher operating voltage obtained from the Power Module that allows the Audio Enunciator to produce even a higher level warning tone. The I/O buss 511 contains control signals for operating both the verbal and audio warning signals. The audio signals produced by the Audio Module 508 drive the Speaker 510 by buss 530. The Audio Module provides verbal warnings and instructions related to parking/service brake operation and problems associated with the operation and use of these systems.

Tonal portion of the Audio Module is controlled by two signals from the microcontroller in an embodiment of the present invention. The signals make full use of the tri-state outputs of the microcontroller I/O ports. The microcontroller signals are sent to the Audio module as part of buss 511. The audio tones provides the user (e.g., driver) with an audio indication (warning) of an impending change of state (going from applied to released or going from released to applied) of the electrically operated parking brake-by-wire system or an indication of a fault condition. In the case of static operation, with the vehicle in 'Park' or 'Neutral', the Audio Module sounds a short 'chirp'. While in the event of dynamic operation, with the vehicle in gear (moving), the Audio Module sounds three short 'beeps' prior to the initiation of an apply cycle, which allows time for the operator or other user to cancel the impending apply operation in the case of inadvertent or unintentional over-ride application while the vehicle is moving. In an embodiment of the present invention, the Audio Module generates dual tones, 2 KHz and 3.7 KHz, at two different sound intensity levels.

Dash Mounted Indicators 514 consists of a Dash Mounted 'Fault' Indicator/LED 614 and a dash mounted Parking Brake UnSafe Indicator. The Parking Brake UnSafe Module 512 receives control information for the Active I/O 527 within the Electronics Control Unit (ECU) 516 via buss 535. The Operating Program 525 running within the microcontroller instructs the Parking Brake UnSafe Module 512 to illuminate the dash mounted indicator Red showing that the parking brake is unsafe during transitions from either applied to released or released to fully applied.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What is claimed is:

1. An electronically operated parking brake for a vehicle comprising:
    (a) a switch adapted to be operated by a user;
    (b) a control system receiving at least one parameter and information from the switch; wherein
    (c) the control system includes at least one sub-system and wherein the default condition of the sub-system is set at a fault condition unless the control system confirms proper operation of the sub-system, after the control system has confirmed proper operation of the sub-system, then the control system changes the fault condition to an operating condition.

2. An electronically operated parking brake comprising: a visual indicator configured to be viewed by a user;

a switch configured to be operated by a user;

a control system in communication with the visual indicator, the switch and a component, the control system capable of receiving information from the switch;

wherein the control system instructs the visual indicator to attain a first state after receiving information from switch while the control system receives diagnostic information from the component related to the operational status of the component;

if the operational status of the component is acceptable, then the control system instructs the visual indicator to attain a second state.

3. An electronically operated parking brake according to claim 2, wherein the first state is an illumination state.

4. An electronically operated parking brake according to claim 2, wherein the second state is an off state.

5. An electronically operated parking brake according to claim 2, wherein the component is a parking brake.

6. An electronically operated parking brake according to claim 2, wherein the component is a transmission.

7. An electronically operated parking brake according to claim 2, further comprising an audible warning.

8. An electronically operated parking brake according to claim 7, wherein the audible warning sends a first audible signal when the information is received from the switch.

9. An electronically operated parking brake according to claim 8, wherein the audible warning sends a second audible signal when the control system instructs the visual indicator to a second state.

10. An electronically operated parking brake comprising:

an audible indicator configured to be heard by a user;

a switch configured to be operated by a user;

a control system in communication with the audible indicator, the switch and a component, the control system capable of receiving information from the switch;

wherein the control system instructs the audible indicator to send a first audible warning after receiving information from switch and while the control system receives diagnostic information from the component related to the operational status of the component;

if the operational status of the component is acceptable, then the control system instructs the audible indicator to send a second audible warning.

11. An electronically operated parking brake according to claim 10, wherein the first state includes a first series of tones.

12. An electronically operated parking brake according to claim 11, wherein the second state includes a second series of tones that are different than the first series of tones.

* * * * *